(12) United States Patent
Sakamoto

(10) Patent No.: US 7,999,439 B2
(45) Date of Patent: Aug. 16, 2011

(54) LINEAR DRIVE ULTRASONIC MOTOR

(75) Inventor: Tetsuyuki Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/909,046

(22) Filed: Oct. 21, 2010

(65) Prior Publication Data

US 2011/0031847 A1 Feb. 10, 2011

Related U.S. Application Data

(63) Continuation of application No. PCT/JP2009/057181, filed on Apr. 8, 2009.

(30) Foreign Application Priority Data

Apr. 24, 2008 (JP) ................................. 2008-114169

(51) Int. Cl.
*H02N 2/08* (2006.01)
(52) U.S. Cl. .......... 310/323.09; 310/323.01; 310/323.02
(58) Field of Classification Search ............. 310/323.02, 310/323.01, 323.09
See application file for complete search history.

(56) References Cited

U.S. PATENT DOCUMENTS

| | | | | |
|---|---|---|---|---|
| 4,975,614 | A * | 12/1990 | Honda | 310/323.14 |
| 6,211,603 | B1 * | 4/2001 | Iino et al. | 310/323.02 |
| 6,218,767 | B1 | 4/2001 | Akada et al. | |
| 7,432,633 | B2 * | 10/2008 | Sakano | 310/323.02 |
| 7,696,670 | B2 * | 4/2010 | Sakamoto | 310/323.09 |
| 2006/0186760 | A1 * | 8/2006 | Sakano | 310/323.02 |
| 2008/0303384 | A1 * | 12/2008 | Sakamoto | 310/334 |
| 2009/0009029 | A1 * | 1/2009 | Sakamoto | 310/313 R |
| 2009/0224630 | A1 * | 9/2009 | Adachi et al. | 310/317 |

FOREIGN PATENT DOCUMENTS

| | | |
|---|---|---|
| JP | 63-153791 | 10/1988 |
| JP | 03-089873 | 4/1991 |
| JP | 2001-086777 | 3/2001 |
| JP | 3524248 | 2/2004 |
| JP | 2005-093924 | 4/2005 |
| JP | 2006-211839 | 8/2006 |

OTHER PUBLICATIONS

Abstract of Japanese Patent Publication No. 09-191670, dated Jul. 22, 1997.
International Search Report dated Jul. 14, 2009.
International Preliminary Report on Patentability together with the Written Opinion dated Dec. 13, 2010.

* cited by examiner

*Primary Examiner* — Walter Benson
*Assistant Examiner* — Bryan P Gordon
(74) *Attorney, Agent, or Firm* — Scully, Scott, Murphy & Presser, P.C.

(57) ABSTRACT

There is provided a linear drive ultrasonic motor which is capable of achieving a stable thrust, and which has fewer restrictions regarding a relationship with an external apparatus.
The linear drive ultrasonic motor includes at least an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a case member which accommodates the ultrasonic vibrator and the pressing member, and a base member which movably supports the driven member, and the case member is assembled with the base member, in a state of a central portion of the pressing member making a contact with the ultrasonic vibrator, and two end portions sandwiching at least the central portion, from among the end portions of the pressing member making a contact with the case member.

4 Claims, 28 Drawing Sheets

(a)

LINEAR DRIVE ULTRASONIC MOTOR

CROSS-REFERENCE TO RELATED APPLICATIONS

The present application is based upon and claims the benefit of priority from prior Japanese Patent Application No. 2008-114169 filed on Apr. 24, 2008; the entire contents of which is incorporated herein by reference.

TECHNICAL FIELD

The present invention relates to a linear drive ultrasonic motor.

BACKGROUND ART

As a conventional linear drive ultrasonic motor, a vibration apparatus described in Patent Literature 1 can be cited as an example (FIG. 22A and FIG. 22B). Here, FIG. 22A and FIG. 22B are diagrams showing a structure of a conventional linear drive ultrasonic motor, where, FIG. 22A is an exploded perspective view and FIG. 22B is a vertical cross-sectional view.

The vibration apparatus shown in FIG. 22A and FIG. 22B includes a case 906 which accommodates a vibrating body 901, a mobile object 904 which passes through the case 906 and makes a contact with the vibrating body 901, and a pressing spring 905 which generates thrust (bias) which brings the mobile object 904 and the vibrating body 901 in a pressurized contact. The pressing spring 905 is installed at an outer side of the case 906. An opening portion is formed in a side of the case 906, facing the vibrating body 901, and the thrust of the pressing spring 905 acts on the vibrating body 901 through the opening portion. In other words, this vibration apparatus has a structure in which, the pressing spring 905 is installed on the outer side of the case 906 while covering the opening portion of the case 906, and a deformed portion (a flat surface portion covering the opening portion) of the pressing spring 905 which generates the thrust, is exposed.

Patent Literature 1: Japanese Patent No. 3524248 Specification

DISCLOSURE OF THE INVENTION

Problems to be Solved by the Invention

However, in the vibration apparatus described in Patent Literature 1, in a case of installing on some external apparatus, for avoiding a change in the thrust of the pressing spring 905, there is a restriction of designing that the pressing spring 905 does not make a contact with a member of the external apparatus, or in other words, that an arrangement is to be made to avoid the pressing spring 905.

The present invention has been made in view of the abovementioned circumstances, and an object of the present invention is to provide a small-size linear drive ultrasonic motor which is capable of achieving stable thrust, and which has fewer restrictions regarding a relationship with an external apparatus.

Means for Solving the Problems

To solve the abovementioned problems and to achieve the object, a linear drive ultrasonic motor according to the present invention includes at least
an ultrasonic vibrator having a piezoelectric element,
a driven member which is driven by a frictional force between the driven member and the ultrasonic vibrator,
a pressing member which presses the ultrasonic vibrator such that a frictional force is generated between the ultrasonic vibrator and the driven member,
a case member which accommodates the ultrasonic vibrator and the pressing member, and
a base member which movably supports the driven member, and
the case member is assembled with the base member, in a state of a central portion of the pressing member making a contact with the ultrasonic vibrator, and two end portions sandwiching at least the central portion, from among the end portions of the pressing member making a contact with the case member.

In the linear drive ultrasonic motor according to the present invention, it is preferable that an engaging portion is provided to one of the case member and the base member, and an engaged portion is provided to one of the case member and the base member to which the engaging portion is not provided, and the engaging portion and the engaged portion are assembled upon being engaged mutually.

In the linear drive ultrasonic motor according to the present invention, it is preferable that a distance (A) in a direction of height from a surface of the case member in contact with the pressing member, up to a fixing or a latching surface with the base member, a distance (B) in a direction of height from a surface of the pressing member in a natural state without being bent, in contact with the case member, up to a surface of contact with the ultrasonic vibrator, a distance (C) in a direction of height from a surface of the ultrasonic vibrator in contact with the pressing member up to a surface of contact with the driven member, a distance (D) in a direction of height from a surface of the driven member in contact with the ultrasonic vibrator, up to a surface of the base member fixing or latching with the case member, and an amount of deformation by bending (X) in a direction of height which generates a desired thrust of the pressing member satisfy a relationship $(A)=(B)+(C)+(D)-(X)$.

In the linear drive ultrasonic motor according to the present invention, it is preferable that a first recess is provided to one of the case member and the pressing member, and a first protruding portion is provided to one of the case member and the pressing member to which the first recess is not provided, and the first protruding portion is accommodated in the first recess, and the case member guides the pressing member to a position on a surface orthogonal to a direction of pressing.

In the linear drive ultrasonic motor according to the present invention, it is preferable that the case member, on a side surface of an accommodating recess which accommodates the ultrasonic vibrator and the pressing member, has a projecting portion which comes close to at least a part of an end surface in a direction of width of the pressing member.

In the linear drive ultrasonic motor according to the present invention, a second recess can be provided to one of the case member and the ultrasonic vibrator, and a second protruding portion can be provided to one of the case member and the ultrasonic vibrator to which the second recess is not provided, and the second protruding portion can be accommodated in the second recess, and the case member is capable of guiding the ultrasonic vibrator.

In the linear drive ultrasonic motor according to the present invention, it is preferable that the case member, on an upper surface of an accommodating recess which accommodates the ultrasonic vibrator and the pressing member, has two third-protruding portions making a contact with the pressing member and the two end portions respectively.

In the linear drive ultrasonic motor according to the present invention, it is preferable that an engaging portion which is narrower than a width of the second recess or the second protruding portion is provided in a direction of width of the ultrasonic vibrator, to the case member, at the second recess or the second protruding portion to which the ultrasonic vibrator is guided.

In the linear drive ultrasonic motor according to the present invention, it is desirable that the case member is provided with a through hole or a notch, in at least a part of a side surface thereof.

In the linear drive ultrasonic motor according to the present invention, it is preferable that the case member includes a resin material.

In the linear drive ultrasonic motor according to the present invention, a resin member can be outsert-molded on a portion of the pressing member in contact with the case member, or on a portion of the pressing member in contact with the ultrasonic vibrator, or on both portions of the pressing member in contact with the case member and the ultrasonic member.

In the linear drive ultrasonic motor according to the present invention, it is preferable that the pressing member is molded integrally with the case member.

Effects of the Invention

There is shown an effect that the linear drive ultrasonic motor is capable of achieving a stable thrust, and has fewer restrictions regarding a relationship with an external apparatus, and a small-sizing thereof is possible.

DESCRIPTION OF REFERENCE NUMERALS

Figure 1A:
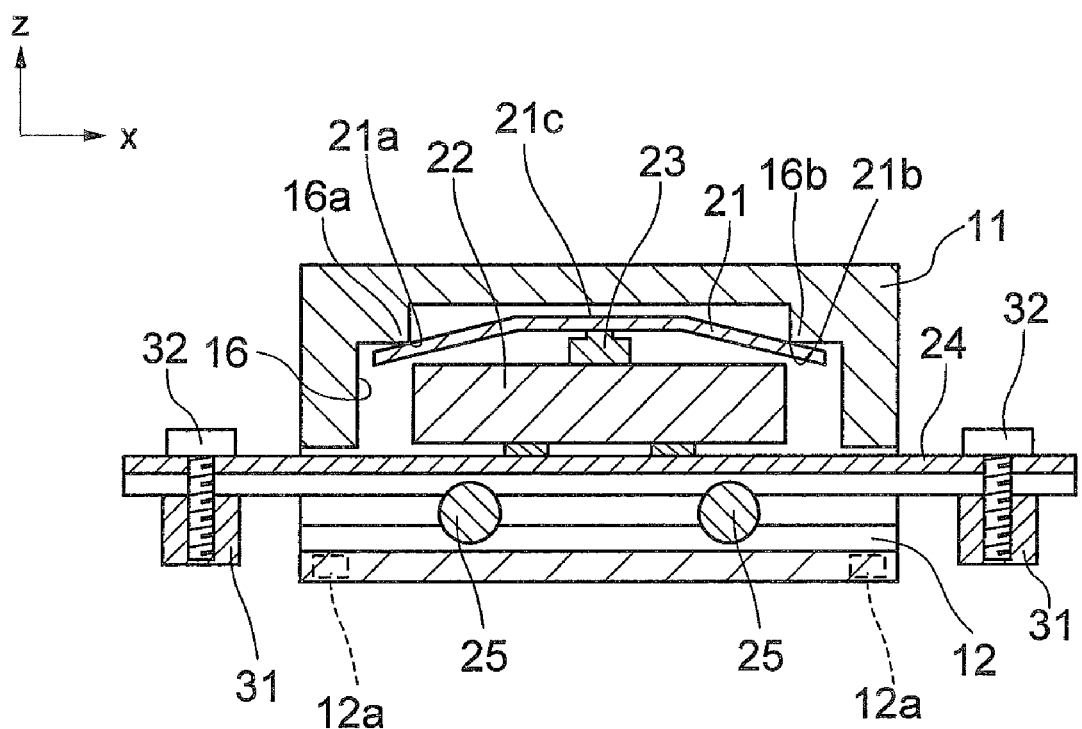
FIG. 1A is a diagram showing a structure of an ultrasonic motor according to a first embodiment, and is a cross-sectional view taken along a line IA-IA in FIG. 1B.

10 ultrasonic motor (linear drive ultrasonic motor)
11 case member 11a notch (engaged portion)
12 base member
12a base protruding portion (engaging portion)
13 opening portion
16 accommodating recess
16a, 16b contact projecting portions
17a, 17b inner walls
21 pressing member
21a, 21b end portions
21c central portion
22 vibrator (ultrasonic vibrator)
23 supporting member
24 driven member
25 rolling member
31 connecting member
32 connecting-member fixing screw
33, 34 installing holes
35 external apparatus
51 case member
51a notch (engaged portion)
52 base member
52a base protruding portion (engaging portion)
61 case member
61a base protruding portion (engaging portion)
62 base member
62a notch (engaged portion)
71 case member
71a notch (engaged portion)
72 base member
72a base protruding portion (engaging portion)
111 case member
111b case recess (first recess, second recess)
121 pressing member
121b protruding portion (first protruding portion)
123 supporting member
123b protruding portion (second protruding portion)
171 pressing member
171b protruding portion (first protruding portion)
211 case member
211b protruding portion (first protruding portion)
221 pressing member
221b recess (first recess)
261 case member
261b case recess (first recess)
261c case projecting portion
271 pressing member
271b protruding portion (first protruding portion)
311 case member
316 accommodating recess
316a, 316b contact projecting portions (third protruding portions)
361 case member
366 accommodating recess
366a, 366b contact projecting portions
366a1 large-diameter portion
366a2 small-diameter portion
366b1 large-diameter portion
366b2 small-diameter portion
411 case member
416 accommodating recess
416s upper surface
421 pressing member
421a, 421b end portions
421c central portion
461 case member
461b groove
461s upper surface
463 opening portion
466 accommodating recess
467, 468 latching portions
511 case member
512 base member
519 hole portion
561 case member
561a, 561b notches
561c through hole
566 accommodating recess
590 vibrator-holding jig
621 pressing member
621a, 621b, 621c resin member
671 pressing member
671a, 671b end portions

BEST MODE FOR CARRYING OUT THE INVENTION

Embodiments of an ultrasonic motor (linear drive ultrasonic motor) according to the present invention will be described below in detail by referring to the accompanying diagrams. However, the present invention is not restricted to the embodiments described below.

First Embodiment

Figure 1B:
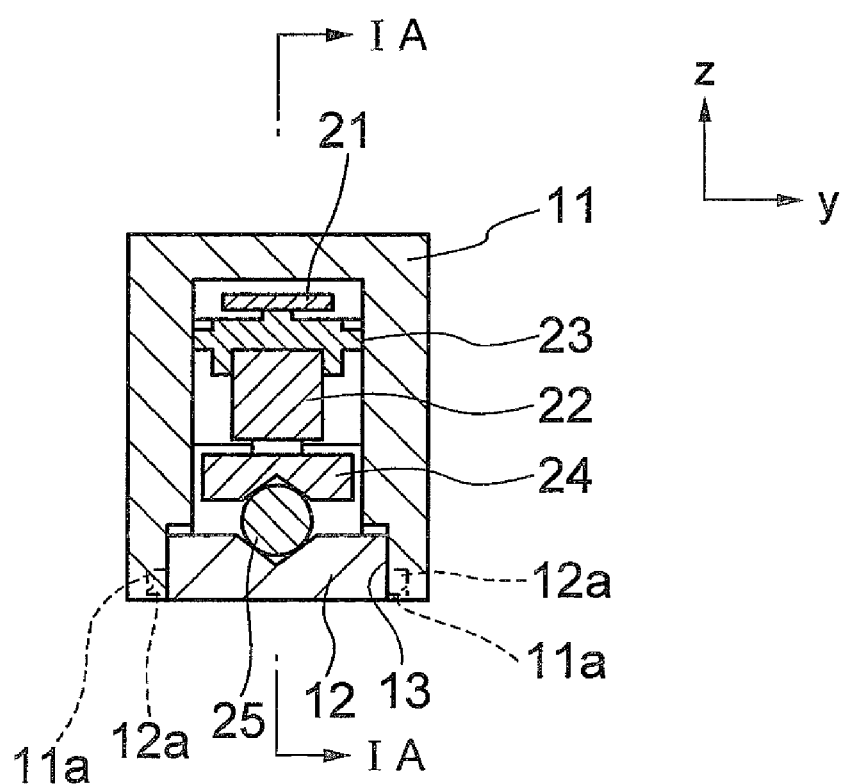
FIG. 1B is a diagram showing a structure of the ultrasonic motor according to the first embodiment, and is a cross-sectional view orthogonal to a center in a longitudinal direction of a case member.

An ultrasonic motor (linear drive ultrasonic motor) 10 according to a first embodiment and modified embodiments thereof will be described while referring to diagrams from FIG. 1 to FIG. 12. Here, FIG. 1A and FIG. 1B are diagrams showing a structure of the ultrasonic motor 10, where, FIG. 1A is a cross-sectional view taken along a line IA-IA in FIG. 1B, and FIG. 1B is a cross-sectional view orthogonal to a center in a longitudinal direction (x-direction) of a case member 11. As shown in FIG. 1, the ultrasonic motor 10 includes a vibrator 22 as an ultrasonic vibrator, a driven member 24, a pressing member 21, a case member 11, and a base member 12. An accommodating recess 16 is formed at an interior of the case member 11 which has a rectangular parallelepiped shape, and it reaches up to an outside from an opening portion 13 which is closed by disposing the base member 12. The vibrator 22 and the pressing member 21 are accommodated in order from a side of the opening portion 13 in a direction of height (z-direction in FIG. 1A) of the ultrasonic motor 10, inside the accommodating recess 16. The pressing member 21 is a plate spring in the form of a long plate, and is disposed such that a longitudinal direction thereof is along a longitudinal direction (x-direction in FIG. 1) of the ultrasonic motor 10 and the case member 11.

The pressing member 21 is disposed such that, an upper surface of two end portions 21a and 21b in the longitudinal direction make a contact with contact projecting portions 16a and 16b at two locations provided on an upper surface of the accommodating recess 16 of the case member 11, and a lower surface of a central portion 21c makes a contact with a supporting member 23 which is for positioning the vibrator 22. Here, the supporting member 23 is fixed to a center in the longitudinal direction (x-direction in FIG. 1A) of the vibrator 22. Moreover, the vibrator 22 is formed by an ultrasonic vibrator (such as a piezoelectric element). In the following diagrams, an electric wires for driving the vibrator 22 are omitted.

The driven member 24 in the form of a long plate is disposed on the base member 12 via a rolling member 25, such that the driven member 24 is movable along the longitudinal direction of the case member 11. Moreover, a base protruding portion 12a (engaging portion) is provided one each at two end portions of two sides which are face-to-face, of the base member 12 in the form of a long plate. Whereas, a notch 11a (an engaged portion) is provided in an inner side surface of the opening portion 13 of the case member 11, at a position corresponding to the case protruding portion 12a. The base member 12 is assembled inside the case member 11 by latching the notch 11a of the case member 11 and the base protruding portion 12a of the corresponding base member 12.

The case member 11 has hardness sufficiently higher than the pressing member 21, and even when the case member 11 makes a contact with a member of an external apparatus which is not shown in the diagram, an amount of bending of the pressing member 21 does not change. Therefore, a degree of freedom of designing of the external apparatus improves. Moreover, since the pressing member 21 is not exposed to an outside of the case member 11, an outer shape of the case member 11 can be used for positioning upon bringing in contact with the external apparatus. Furthermore, it is also possible to install directly on the external apparatus by providing an installing hole in the case member 11.

Figure 2:
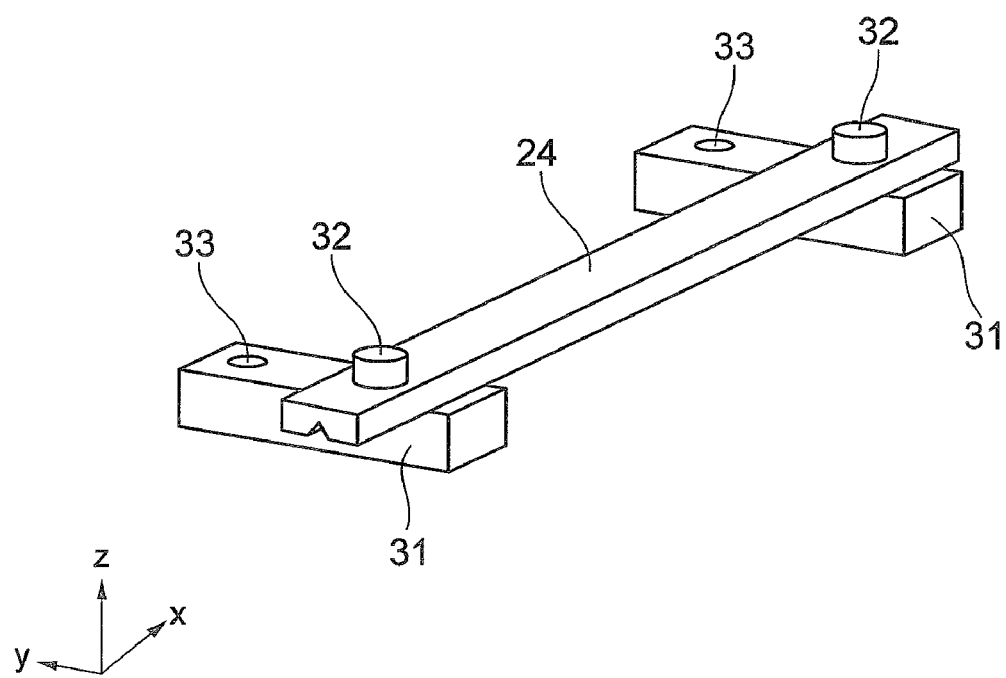
FIG. 2 is a perspective view showing a structure for connecting a driven member and an external apparatus according to the first embodiment.

As shown in FIG. 1A, FIG. 1B, and FIG. 2, a connecting member 31 is connected to two end portions of the driven member 24 by connecting member fixing screws 32. It is possible to realize a linear mobile apparatus by the connecting member 31 being connected to an external apparatus (not shown in the diagram). The connection of the connecting member 31 and the external apparatus is carried out by using an installing hole 33 provided in the connecting member 31. Here, FIG. 2 is a perspective view showing a structure for connecting the driven member 24 and the external apparatus. In FIG. 2, the case member 11 is omitted in the diagram.

In the structure described above, since a frictional force is developed between the vibrator 22 and the driven member 24 by the pressing member 21 pressing the vibrator 22 against the driven member 24, the driven member 24 moves in the longitudinal direction thereof due to vibrations of the vibrator 22.

Figure 3:
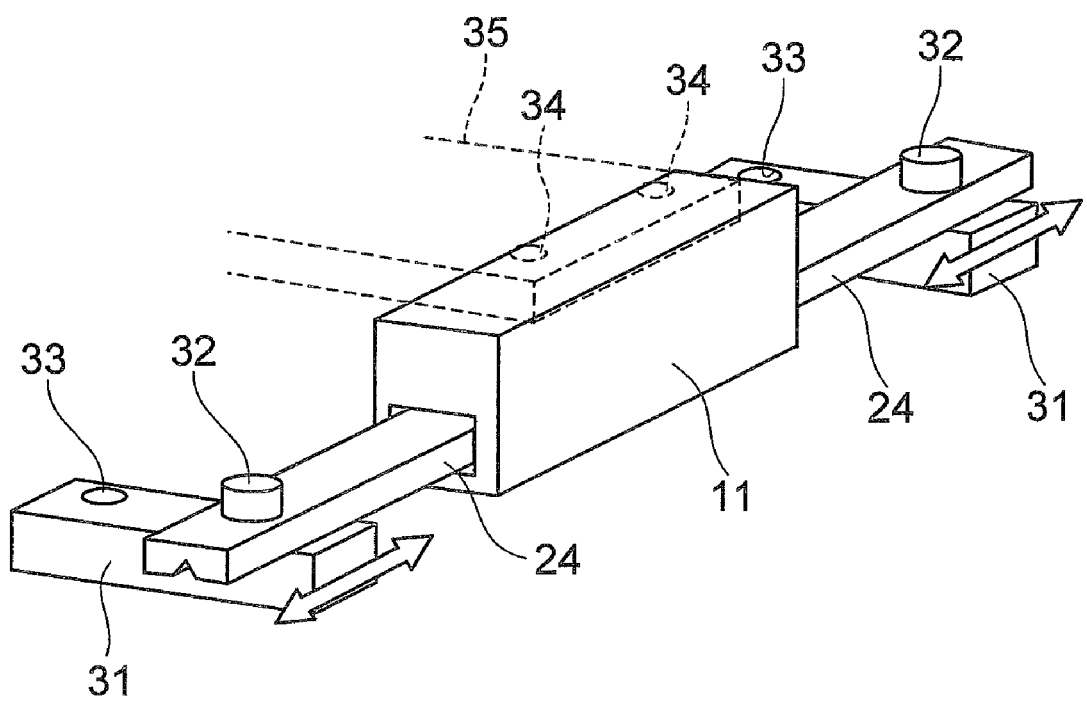
FIG. 3 is a perspective view showing a modified example of the structure for connecting the driven member and the external apparatus.

Moreover, as shown in FIG. 3, an external apparatus 35 can also be fixed to an upper surface of the case member 11. The external apparatus 35 is fixed to the upper surface of the case member 11 by using an installing hole 34. In this case, a movable side of the external apparatus 35 and the driven member 24 can be connected by the installing hole 33 provided at an end portion of the connecting member 31 which is fixed to the driven member 24, by using the connecting member fixing screws 32. Accordingly, a movable portion of the external apparatus which is fixed to the case member 11 becomes movable in a direction (direction of an arrow in FIG. 3) along the longitudinal direction of the driven member 24, along with the driven member 24. Here, FIG. 3 is a perspective view showing a modified example of a structure for connecting the driven member 24 and the external apparatus.

Figure 4:
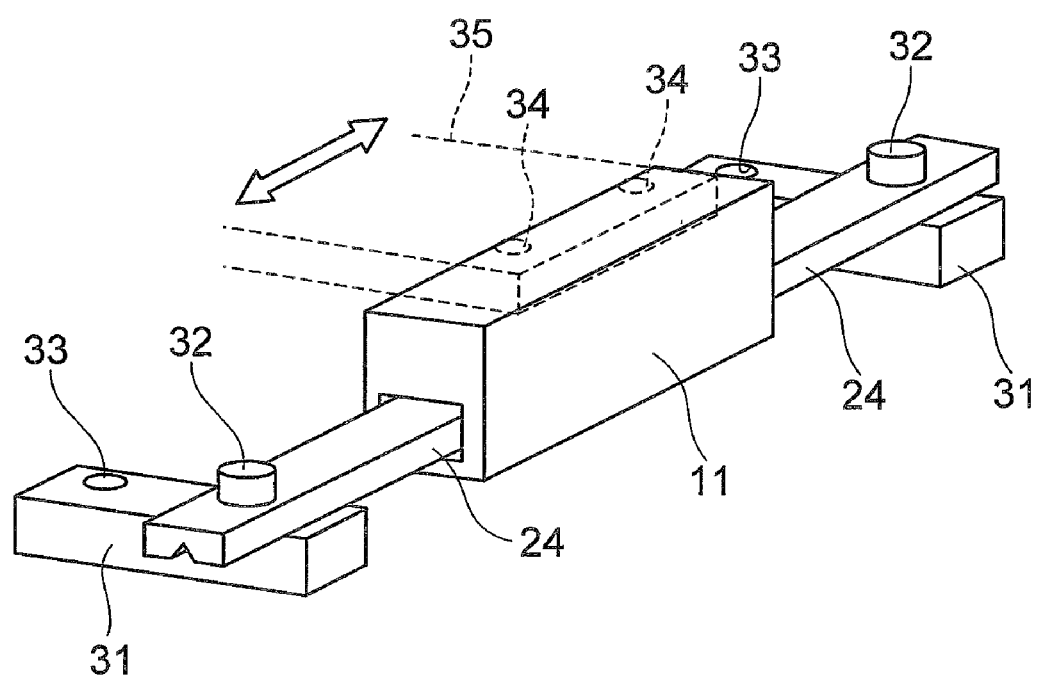
FIG. 4 is a perspective view showing a modified example of the structure for connecting the driven member and the external apparatus.

However, it is also possible to make an arrangement such that, not the portion of the external apparatus 35 which is fixed to the connecting member 31, but a portion of the external apparatus 35 which is fixed to the upper surface of the case member 11 is let to be movable. Accordingly, when the case member 11 is moved, the portion of the external apparatus 35, which is fixed the case member 11 becomes movable in a direction (direction of an arrow in FIG. 4) along the longitudinal direction of the driven member 24. Here, FIG. 4 is a perspective view showing a modified example of a structure for connecting the driven member 24 and the external apparatus.

As it has been described above, since it is possible to fix the case member 11 to the external apparatus, it is possible to apply to a wide range of linear mobile apparatuses while achieving stably the thrust (bias) by the pressing member 21.

Moreover, it is desirable to connect the connecting member 31 which is to be connected to the driven member 24, at a position corresponding to node of vibrations of the driven member 24. Since the driven member 24, when being driven, takes vibrations from the vibrator 22 all the time, it does not move only in the longitudinal direction, but vibrates with a driving frequency of the vibrator 22. In such mode, by providing the connecting member to the node of the driven member 24, it is possible to reduce propagation of vibrations to the external apparatus. Consequently, it is possible to drive the external apparatus in a stable state.

Figure 5:
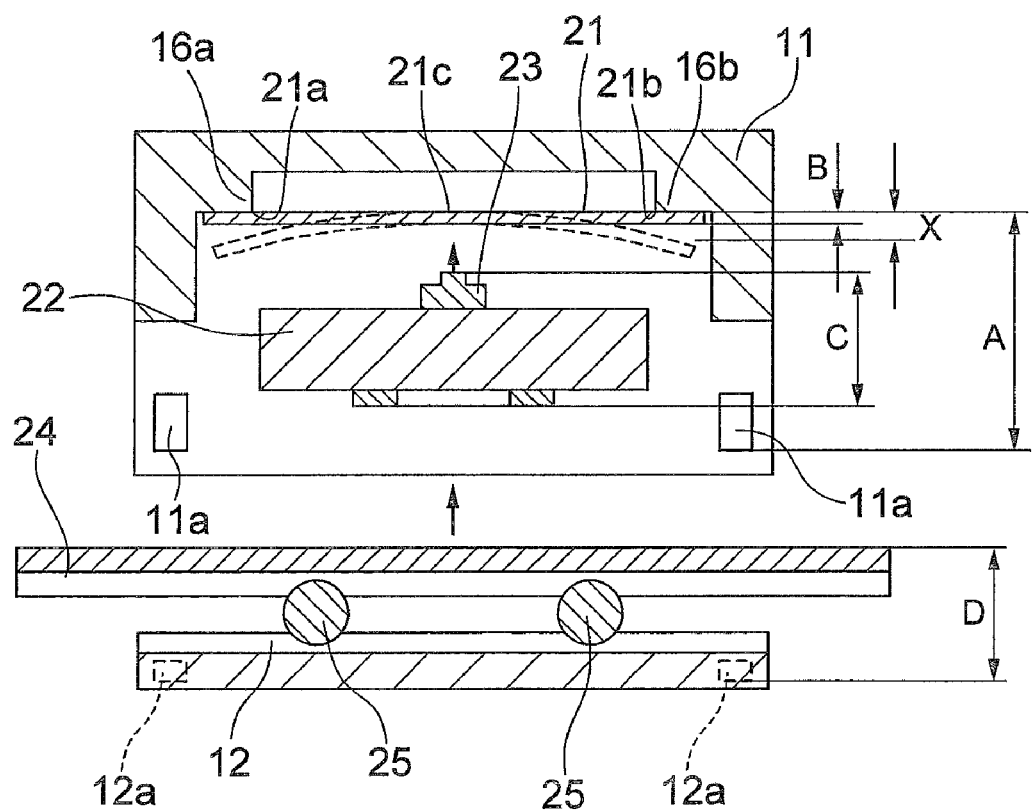
FIG. 5 is an exploded perspective view showing a structure of the ultrasonic motor in a process of assembling according to the first embodiment.

Here, a position at which the case member 11 and the base member 12 are latched, or in other words, a relationship of positions in a direction of height of the base protruding portion 12a of the base member 12 and the notch 11a of the case member 11 will be described while referring to FIG. 5. FIG. 5 is an exploded perspective view showing a structure of the ultrasonic motor 10 in a process of assembling.

In the ultrasonic motor 10, the following expression (1) is satisfied.

$$A = B + C + D - X \tag{1}$$

Here, A, B, C, D, and X are as follows.

A: a distance from a surface of the case member 11 in contact with the pressing member 21 (contact projecting portions 16a and 16b), up to a latched contact surface (a bottom surface of the notch 11a) of the base member 12

B: a distance from a surface of the pressing member 21 in a natural state without being bent, in contact with the case member 11 (the upper surface of the two end portions 21a and 21b), up to a surface of contact (the lower surface of the central portion 21c) with the supporting member 23

C: a distance from a surface of the supporting member 23 in contact with the pressing member 21, up to a surface of the vibrator 22 in contact with the driven member 24

D: a distance from a surface of the driven member 24 in contact with the vibrator 22, up to a surface of the base member 12 in latched contact with the case member 11 (a bottom surface of the base protruding portion 12a)

X: an amount of bending which is necessary for generating a desired pressure for contact between the vibrator 22 and the driven member 24.

In other words, when the case member 11 is assembled with the base member 12, the contact projecting portions 16a and 16b of the case member 11 make a contact with the two end portions 21a and 21b of the pressing member 21. Since the pressing member 21 of which, the central portion 21c is supported by the supporting member 23 is bent to a desired shape according to a shape of the protruding portion of the contact projecting portions 16a and 16b, and positions of the notch 11a and the base protruding portion 12a, an arrangement is such that a desired thrust from the pressing member 21 acts on the driven member 24 from the vibrator 22. Since the case member 11 is a rigid body having hardness sufficiently higher than the pressing member 21, an amount of deformation of the distance A in FIG. 5 due to assembling is small and does not have an effect on the thrust. Moreover, a spring constant can be set to be small by making the pressing member 21 narrow in a direction of width (y-direction in FIG. 1B). For these two reasons, since it is possible to make small an increase and decrease in the thrust with respect to the change in the amount of bending in addition to an improvement in an accuracy of the amount of bending, the accuracy of thrust improves.

Moreover, when the case member 11 is let to be a molded component, a variation in fixing of the distance A in FIG. 5 becomes small, and the pressing member 21 being a simple flat-plate shaped in a natural state, a shape variation is less. Accordingly, it is possible to reduce the variation in fixing of the thrust. As a result, by making such an arrangement, even in a structure of capsuling the pressing member 21 in the case member 11, it is possible to improve the accuracy of the thrust and to make small the variation in fixing. Moreover, since the degree of freedom of designing of the external apparatus is not restricted by the case member 11, it is possible to realize a linear ultrasonic motor which is applicable to a wide range of external apparatuses.

Second Embodiment

Figure 6A:
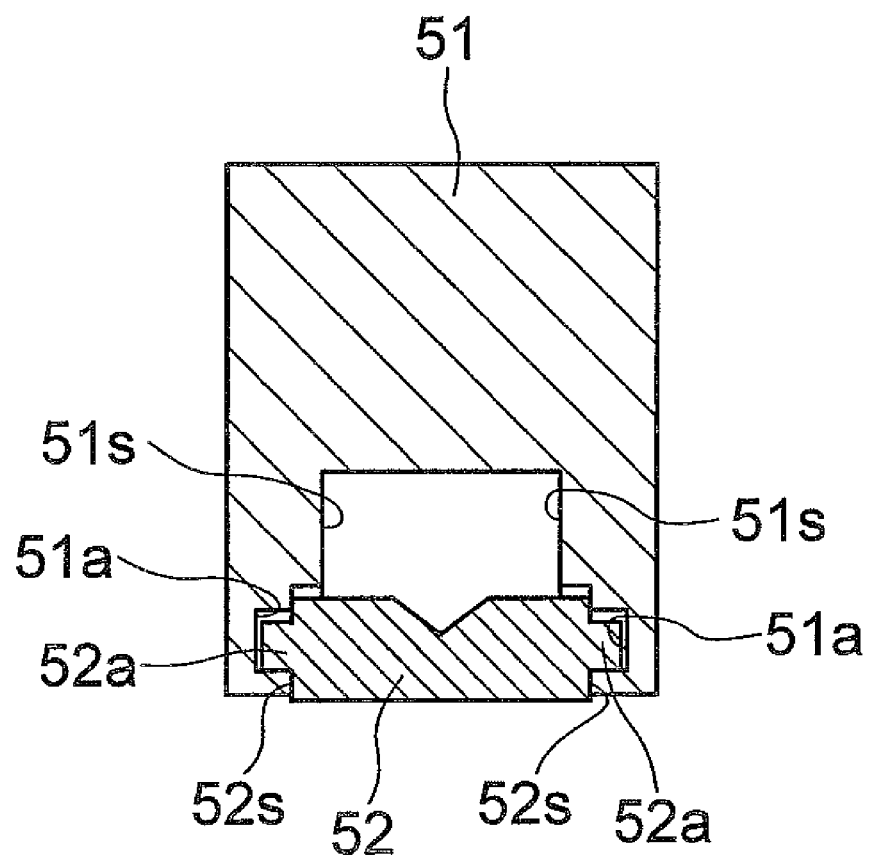
FIG. 6A is a diagram showing an arrangement for latching the case member and the base member in an ultrasonic motor according to a second embodiment.
Figure 6B:
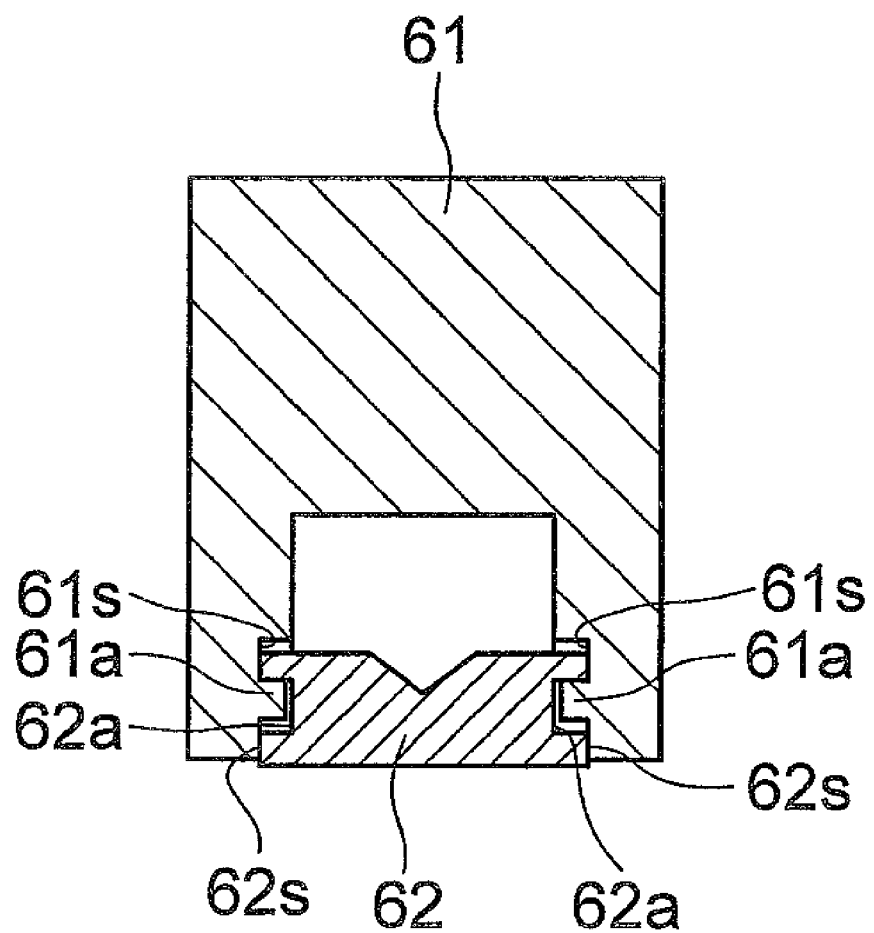
FIG. 6B is a diagram showing an arrangement for latching a case member and a base member in an ultrasonic motor according to a modified embodiment of the second embodiment.
Figure 7A:
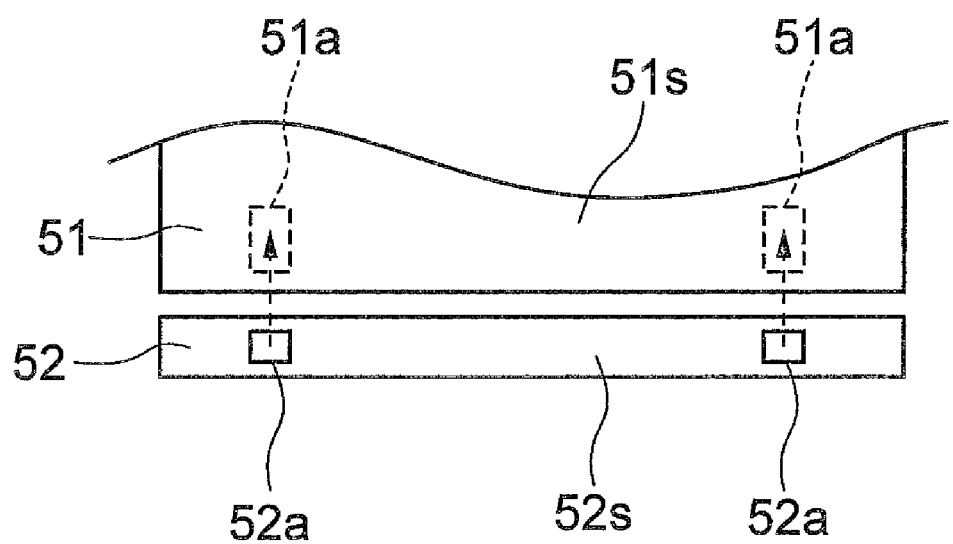
FIG. 7A is a diagram showing the arrangement for latching the case member and the base member in the ultrasonic motor according to the second embodiment.
Figure 7B:
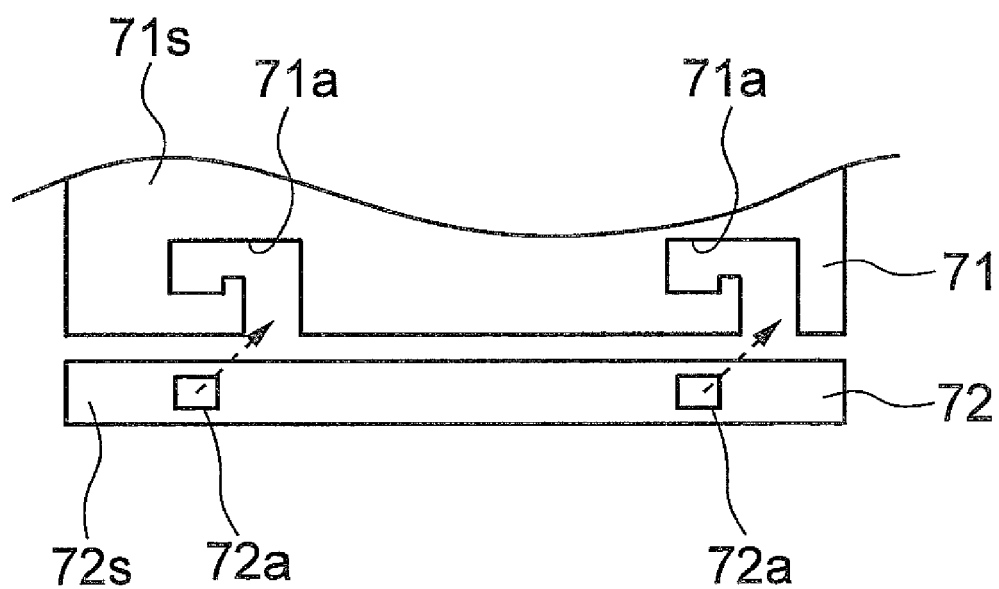
FIG. 7B is a diagram showing an arrangement for latching a case member and a base member in an ultrasonic motor according to another modified embodiment of the second embodiment.

Next, an ultrasonic motor according to a second embodiment and modified embodiments thereof will be described while referring to FIG. 6A, FIG. 6B, FIG. 7A, and FIG. 7B. FIG. 6A and FIG. 6B are vertical cross-sectional views corresponding to FIG. 1B, where, FIG. 6A is a diagram showing an arrangement for latching a case member 51 and a base member 52 in the ultrasonic motor according to the second embodiment, and FIG. 6B is a diagram showing an arrangement for latching a case member 61 and a base member 62 in the ultrasonic motor according to the modified embodiment of the second embodiment. In FIG. 7A and FIG. 7B, FIG. 7A is a diagram showing the arrangement for latching the case member 51 and the base member 52 in the ultrasonic motor according to the second embodiment, and FIG. 73 is a diagram showing an arrangement for latching a case member 71 and a base member 72 in the ultrasonic motor according to another modified embodiment of the second embodiment. In FIG. 7A and FIG. 7B, side views showing a structure of a surface provided with the arrangement for latching of the case member and the base member are indicated side-by-side.

As shown in FIG. 6A and FIG. 7A, a base protruding portion 52a (engaging portion) is provided on an outer side surface of the base member 52, and a notch 51a (an engaged portion) corresponding to the base protruding portion 52a is provided to an inner side surface 51s of the case member 51. By latching the base protruding portion 52a formed in such manner, inside the notch 51a, it is possible to assemble the base member 52 inside the case member 51.

The rest of the structure, action, and effect are similar as in the first embodiment.

However, the arrangement for latching may be reverse with male and female portions reversed as shown in FIG. 6B. In other words, a notch (an engaged portion) is provided to an outer side surface 62a of the base member 62, and a base protruding portion (engaging portion) 61a corresponding to the notch 62a is provided on an inner side surface 61s of the case member 61.

Moreover, a latching form of the case member and the base member may be a notch 71a (an engaged portion) in the form of a through hole as shown in FIG. 7B instead of the notch 51a in the form of a recess hole as shown in FIG. 7A. Concretely, a notch 71a having a key shape which is cut through a direction of thickness of an inner side surface 71s is provided in the inner side surface 71s of a case member 71, as well as a base protruding portion 72a (an engaging portion) corresponding to the notch 71a is provided on an inner side surface 72s of the base member 72. According to such arrangement, it is possible to assemble the base protruding portion 72a of the base member 72 upon sliding along a shape of the inner side surface of the notch 71a of the case member 71, and accordingly, it is possible to assemble easily the case member 71 and the base member 72 without being deformed.

Third Embodiment

Figure 8:
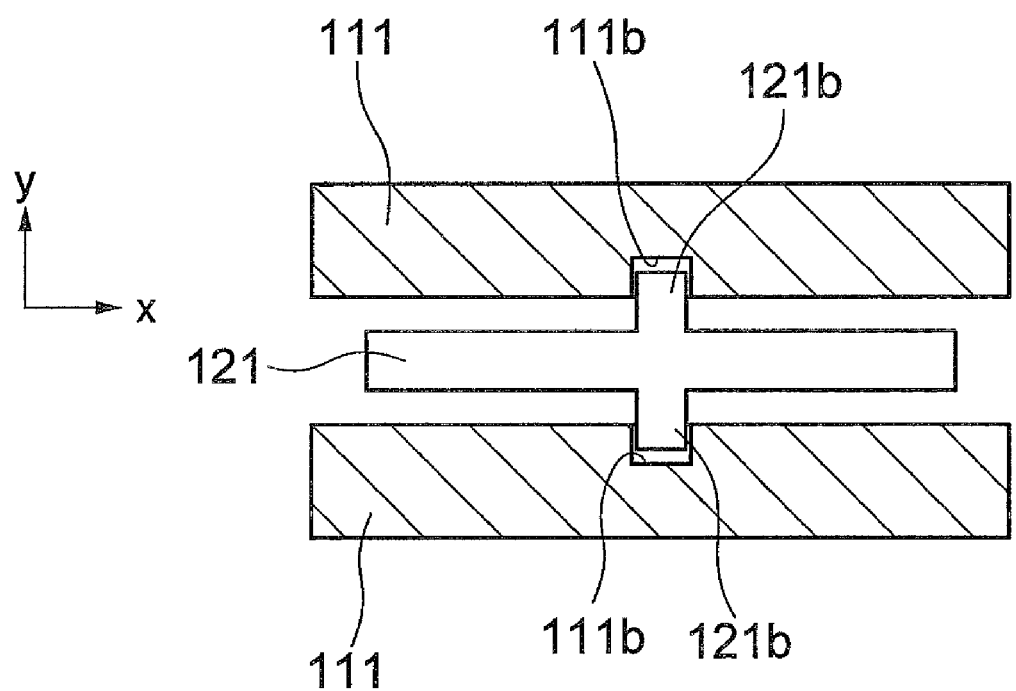
FIG. 8 is a plan view showing an arrangement for regulating a position of a pressing member by a case member in an ultrasonic motor according to a third embodiment.
Figure 9:
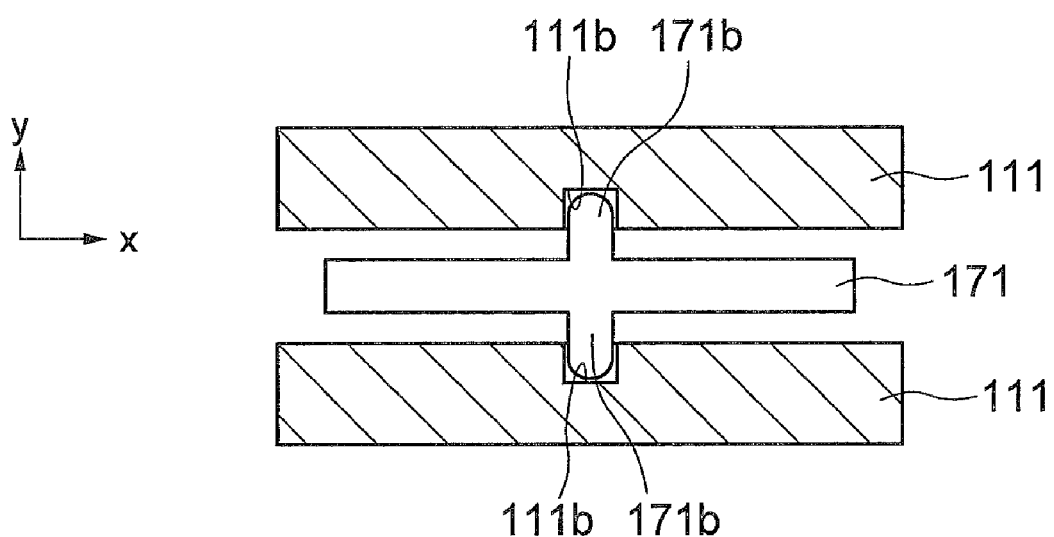
FIG. 9 is a plan view showing an arrangement for regulating a position of a pressing member by a case member in an ultrasonic motor according to a modified embodiment of the third embodiment.
Figure 10:
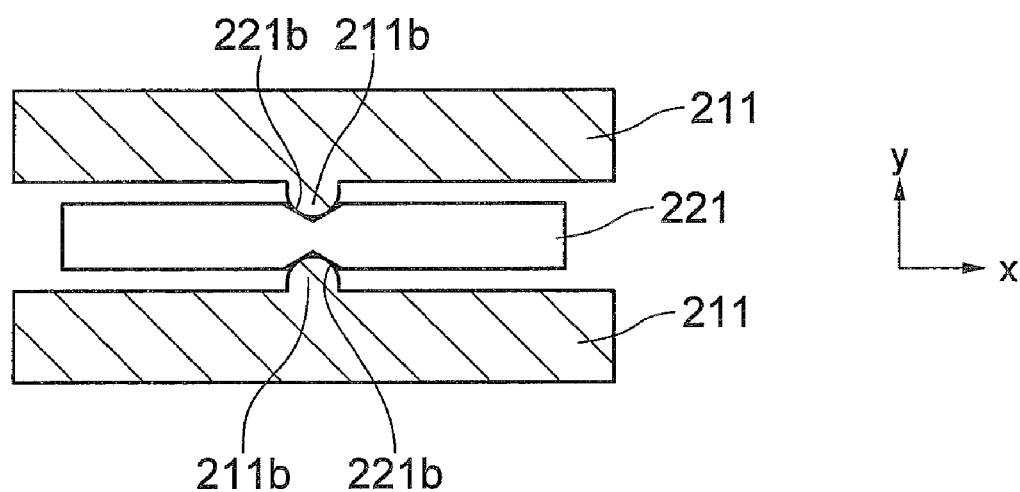
FIG. 10 is a plan view showing an arrangement for regulating a position of a pressing member by a case member in an ultrasonic motor according to another modified embodiment of the third embodiment.
Figure 11:
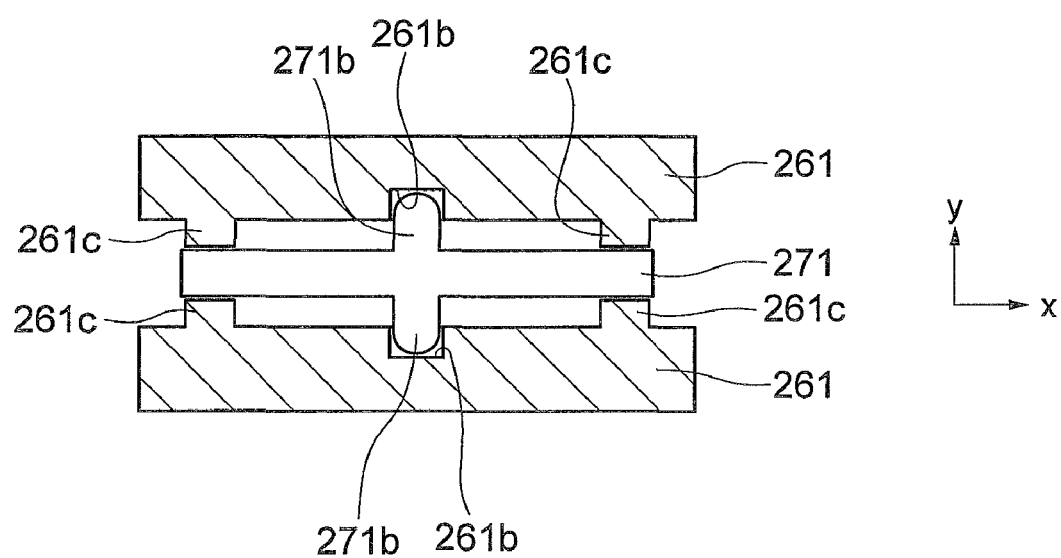
FIG. 11 is a plan view showing an arrangement for regulating a position of a pressing member by a case member in an ultrasonic motor according to still another modified embodiment of the third embodiment.

Next, an ultrasonic motor according to a third embodiment and modified embodiments thereof will be described below by referring to diagrams from FIG. 8 to FIG. 11. FIG. 8 is a plan view showing an arrangement for regulating a position of a pressing member 121 by a case member 111 in the ultrasonic motor according to the third embodiment. FIG. 9 is a plan view showing an arrangement for regulating a position of a pressing member 171 by the case member 111 in an ultrasonic motor according to a modified embodiment of the third embodiment. FIG. 10 is a plan view showing an arrangement for regulating a position of a pressing member 221 by a case member 211 in an ultrasonic motor according to another modified embodiment of the third embodiment. FIG. 11 is a plan view showing an arrangement for regulating a position of a pressing member 271 by a case member 261 in an ultrasonic motor according to still another modified embodiment of the third embodiment.

In the ultrasonic motor according to the third embodiment shown in FIG. 8, a protruding portion 121b (a first protruding portion) which protrudes in a direction of width (y-direction) is provided at a substantially central portion in a longitudinal direction (x-direction) of the pressing member 121, as well as, a case recess 111b (a first recess and a second recess) is provided in the case member 111, at a position corresponding to the protruding portion 121b. The case recess 111b is cut through up to an opening portion, in a direction of height (z-direction) of the case member 111. Consequently, by engaging the protruding portion 121b of the pressing member 121 inside the case recess 111b of the case member 111 from the opening portion, it is possible to regulate the position of the pressing member 121 in a direction of xy-plane. Furthermore, since it is possible to dispose the central portion in the longitudinal direction of the pressing member 121 by engaging the protruding portion 121b inside the case recess 111b, it is possible to improve assemblability.

The rest of the structure, action, and effect are similar as in the first embodiment.

However, as shown in FIG. 9, a protruding portion 171b (a first protruding portion) which protrudes in a direction of width (y-direction) can be provided at a substantially central position in a longitudinal direction (x-direction) of a pressing member 171, and furthermore, an end portion of this protruding portion 171b can be let to be a circular-arc shape. When the protruding portion 171b of the pressing member 171 is engaged with the case recess 111b of the case member 111, it is possible to regulate a position of the pressing member 171 in a direction of xy-plane, as well as it is possible to improve assemblability.

Moreover, as shown in FIG. 10, a protruding portion 211b (a first protruding portion) which protrudes inward may be provided at a substantially central portion in a longitudinal direction (x-direction) of a case member 211, and a recess 221b (a first recess) may be provided in a pressing member 221, at a position corresponding to the protruding portion 211b. With an arrangement of bringing the protruding portion 211b of the case member 211 in contact inside the recess 221b of the pressing member 221, by the pressing member 221 being guided to the case member 211, and assembled, the assemblability is improved.

Furthermore, as shown in FIG. 11, a protruding portion 271b (a first protruding portion) which protrudes in a direction of width (y-direction) can be provided at a substantially central portion in a longitudinal direction (x-direction) of a pressing member 271, and a case recess 261b (a first recess) can be provided in a case member 261, at a position corresponding to the protruding portion 271b, and still furthermore, a case projecting portion 261c which is projected to be close to an edge surface of the pressing member 271 may be provided on the case member 261. When such an arrangement is made, a position of the pressing member 271, in a direction of rotation in xy-plane is regulated. Moreover, a variation in a position of the pressing member 271 is reduced, and the assemblability is improved. It is desirable to dispose the case projecting portion 261c at a position away from the pressing member 271, in the longitudinal direction.

Fourth Embodiment

Next, an ultrasonic motor according to a fourth embodiment will be described by referring to FIG. 12A and FIG. 12B. FIG. 12 is a plan view showing an arrangement for regulating a position of a supporting member 123 by the case member 111 in the ultrasonic motor according to the fourth embodiment. In the fourth embodiment, same reference numerals are assigned to components which are similar in the first embodiment or the third embodiment, and description in detail thereof is omitted.

Figure 12A:
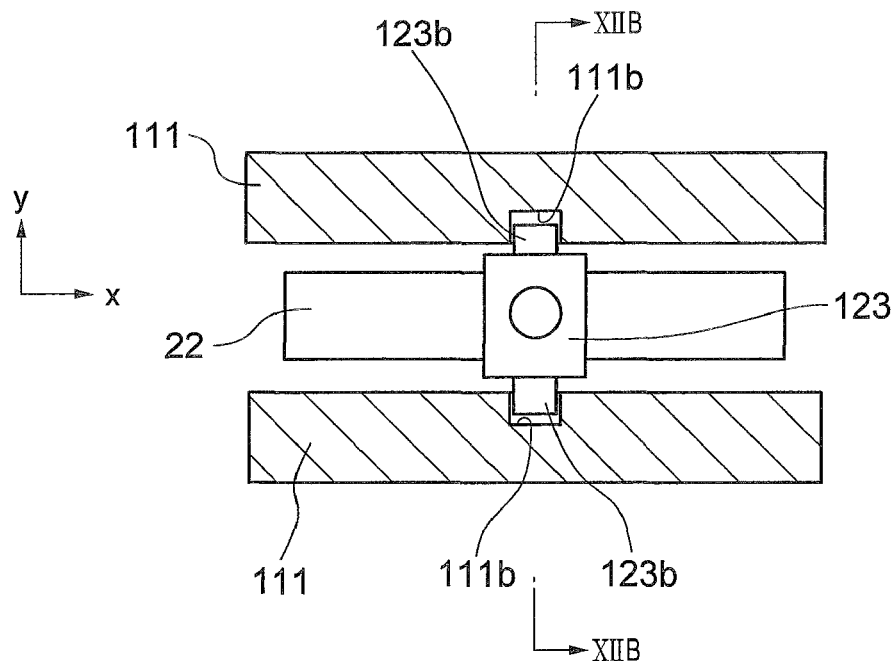
FIG. 12A is a plan view showing an arrangement for regulating a position of a supporting member by a case member in an ultrasonic motor according to a fourth embodiment.
Figure 12B:
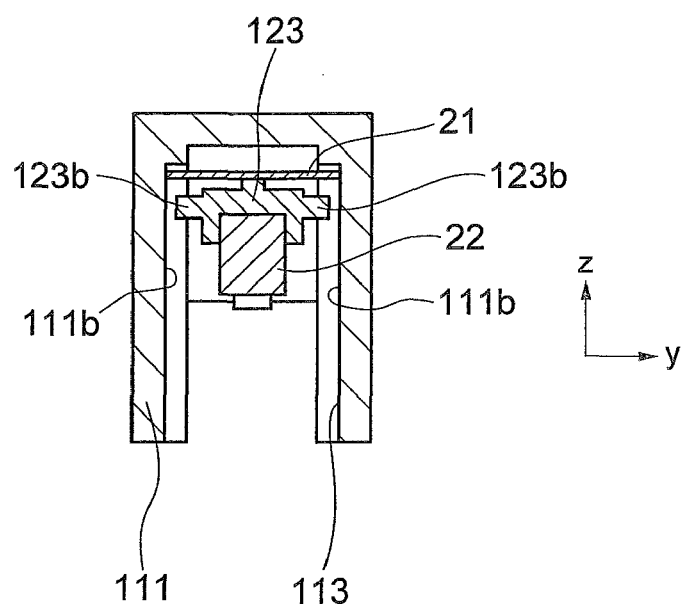
FIG. 12B is a plan view showing an arrangement for regulating a position of the supporting member by the case member in the ultrasonic motor according to the fourth embodiment.

In the ultrasonic motor according to the fourth embodiment shown in FIG. 12A and FIG. 12B, the case recess 111b is provided at the substantially central position in the longitudinal direction (x-direction) of the case member 111 similarly as in the ultrasonic motor shown in FIG. 8. The case recess 111b is cut through in a direction of height (z-direction) of the case member 111, up to an opening portion 113. Moreover, a protruding portion 123b (a second protruding portion) is provided corresponding to the case recess 111b of the case member 111, on the supporting member 123 which is fixed at a substantially central portion in a longitudinal direction (x-direction) on an upper surface of the vibrator 22. With this arrangement, it is possible to carry out positioning of the vibrator 22 by fitting the protruding portion 123b of the supporting member 123 inside the case recess 111b of the case member 111 from a side of the opening portion 113. Furthermore, as it has been described as the third embodiment, the case recess 111b of the case member 111 carries out positioning of the pressing member 121, and it is possible to improve assemblability. A recess in which the protruding portion 123 of the supporting member 123 is to be fitted may be provided separately from the case recess 111b in which, the protruding portion 121b of the pressing member 121 is fitted. Moreover, a protruding portion may be provided on the case member 111 and a recess may be provided in the supporting member 123.

Fifth Embodiment

Figure 13:
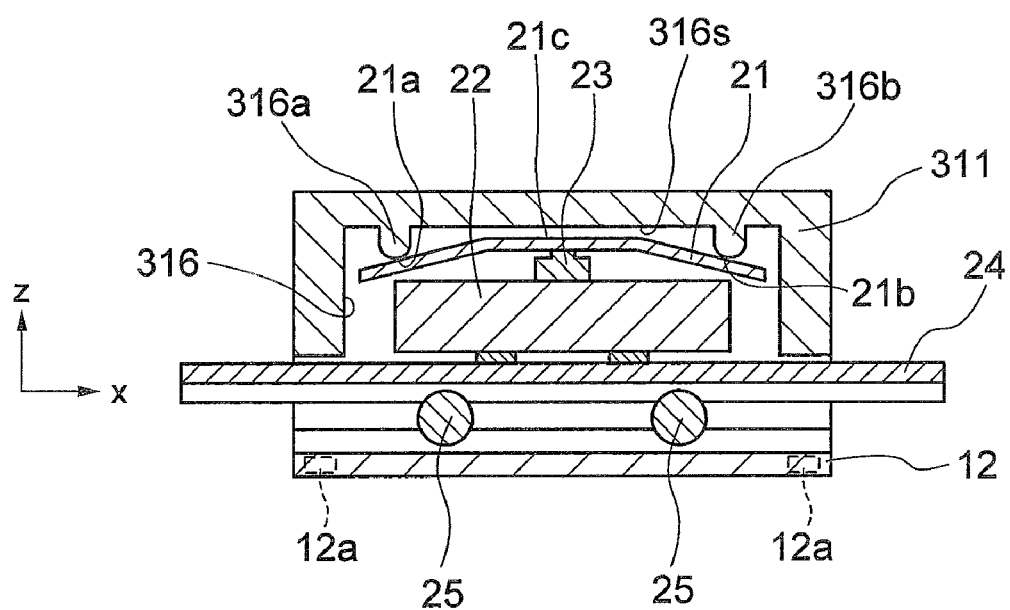
FIG. 13 is a vertical cross-sectional view showing a structure of an ultrasonic motor according to a fifth embodiment.
Figure 14:
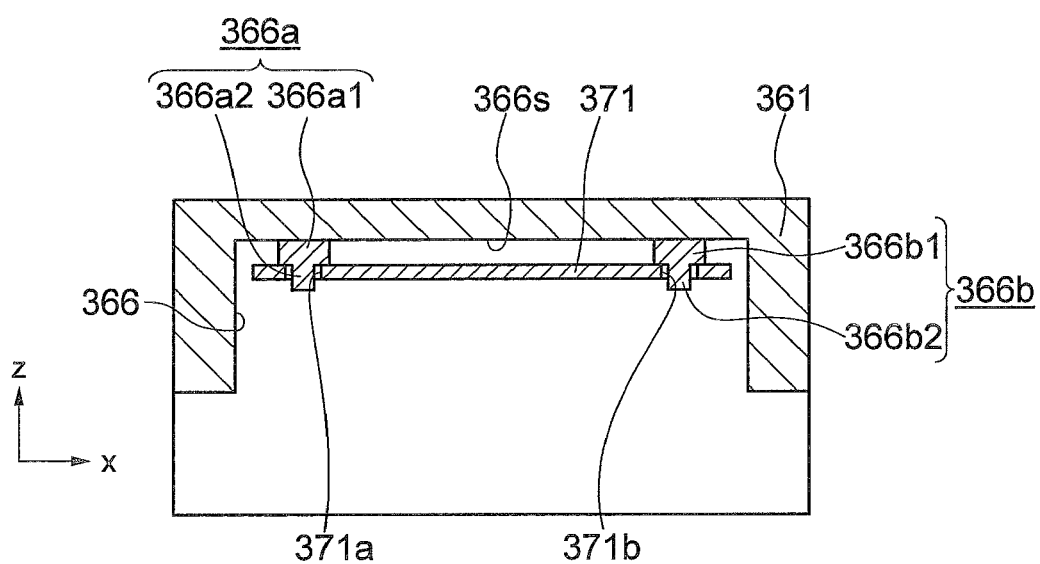
FIG. 14 is a vertical cross-sectional view showing an arrangement of contact between a case member and a pressing member in an ultrasonic motor according to a modified embodiment of the fifth embodiment.

Next, an ultrasonic motor according to a fifth embodiment will be described by referring to FIG. 13. FIG. 13 is a vertical cross-sectional view showing a structure of the ultrasonic motor according to the fifth embodiment, and is a diagram corresponding to FIG. 1A. FIG. 14 is a vertical cross-sectional view showing an arrangement of contact between a case member and a pressing member in an ultrasonic motor according to a modified embodiment of the fifth embodiment. FIG. 14 is a diagram corresponding to FIG. 1A, and a structure excluding the case member and the pressing member is omitted in this diagram.

In the ultrasonic motor according to the fifth embodiment, an upper surface 316s of an accommodating recess 316 which is provided in a case member 311 forms a flat surface, and contact projecting portions 316a and 316b (third protruding portions) having a circular-shaped front end are provided on the upper surface 316s, at positions corresponding to two end portions 21a and 21b of the pressing member 21. With this arrangement, the front ends of the contact projecting portions 316a and 316b make a contact with the two end portions 21a and 21b of the pressing member 21, and the pressing member 21 is bent in the form of a projection upward with the central portion 21c as a center. Accordingly, the pressing member 21 generates thrust which presses the vibrator 22 against the driven member 24. In the fifth embodiment, since the pressing member 21 and the contact projecting portions 316a and 316b of the case member 311 make a point contact, it is possible to deform the pressing member 21 without regulating a posture of the pressing member 21.

The rest of the structure, action, and effect are similar as in the first embodiment.

Next, an ultrasonic motor according to a modified embodiment of the fifth embodiment will be described by referring to FIG. 14. As shown in FIG. 14, an upper surface 366s of an accommodating recess 366 which is provided in a case member 361 forms a flat surface. On the other hand, a pressing member 371 has through holes 371a and 371b at two end portions in a longitudinal direction (x-direction) thereof. Contact projecting portions 366a and 366b are formed on the upper surface 366s of the accommodating recess 366, at positions corresponding to the through holes 371a and 371b of the pressing member 371.

The contact projecting portion 366a includes in order from a side of the upper surface 366s, a large-diameter portion 366a1, and a small-diameter portion 366a2 having an outer diameter smaller than the large-diameter portion 366a1, and a step is formed between the large-diameter portion 366a1 and the small-diameter portion 366a2 by a difference in the outer diameter of the large-diameter portion 366a1 and the outer diameter of the small-diameter portion 366a2. Similarly as the contact projecting portion 366a, the contact projecting portion 366b includes in order from a side of the upper surface 366s, a large-diameter portion 366b1 and a small-diameter portion 366b2 having an outer diameter smaller than the large-diameter portion 366b1, and a step is formed between the large-diameter portion 366b1 and the small-diameter portion 366b2 by a difference in the outer diameter of the large-diameter portion 366b1 and the outer diameter of the small-diameter portion 366b2.

Since it is possible to position the pressing member 371 by inserting the small-diameter portion 366a2 of the contact projecting portion 366a and the small-diameter portion 366b2 of the contact projecting portion 366b into the through holes 371a and 371b provided in the pressing member 371, and bringing the large-diameter portion 366a1 of the contact projecting portion 366a and the large-diameter portion 366b1 of the contact projecting portion 366b in contact with the pressing member 371, it is possible to make the assembling easily.

The rest of the structure, action, and effect are similar as in the first embodiment.

Sixth Embodiment

Figure 15:
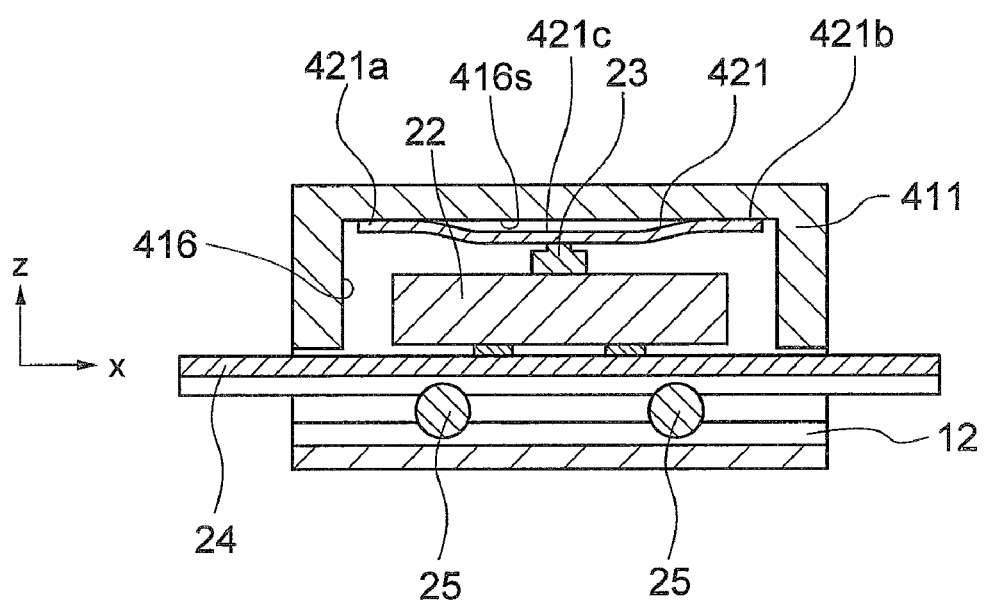
FIG. 15 is a vertical cross-sectional view showing a structure of an ultrasonic motor according to a sixth embodiment.

Next, an ultrasonic motor according to a sixth embodiment will be described by referring to FIG. 15. FIG. 15 is a vertical cross-sectional view showing a structure of the ultrasonic motor according to the sixth embodiment, and is a diagram corresponding to FIG. 1A. In the ultrasonic motor according to the sixth embodiment, an upper surface 416s of an accommodating recess 416 in a case member 411 is a flat surface without unevenness. On the other hand, a pressing member 421 has a projection shape at a bottom, and a central portion 421c in a longitudinal direction (x-direction) thereof is supported by the supporting member 23, and each of two end portions 421a and 421b in the longitudinal directions makes a contact with the upper surface 416s. When the pressing member 421 is let to have such a bent shape, since it is not necessary to provide a protruding portion on a side of a case member 411, a dimensional accuracy of the case member 411 improves.

The rest of the structure, action, and effect are similar as in the first embodiment.

Seventh Embodiment

Figure 16A:
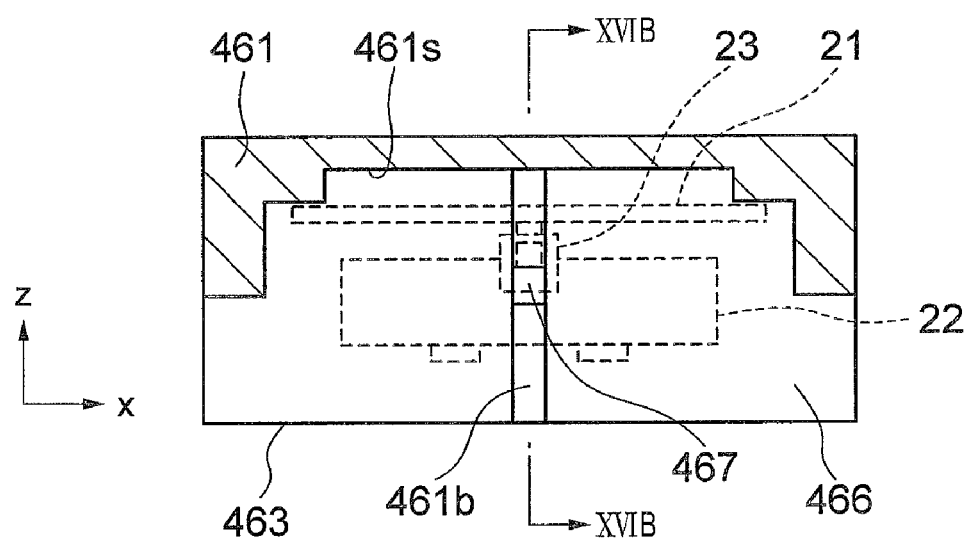
FIG. 16A is a vertical cross-sectional view showing an arrangement for latching a case member of an ultrasonic motor according to a seventh embodiment.
Figure 16B:
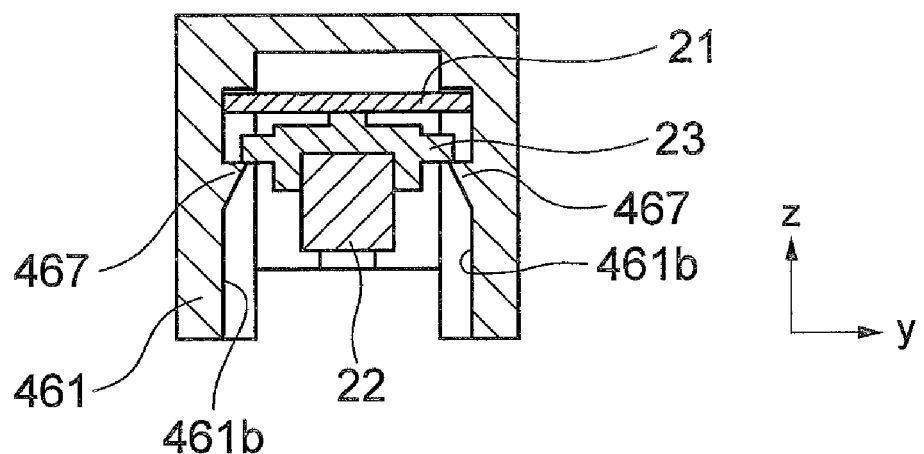
FIG. 16B is a cross-sectional view taken along a line XVIB-XVIB in FIG. 16A.
Figure 17:
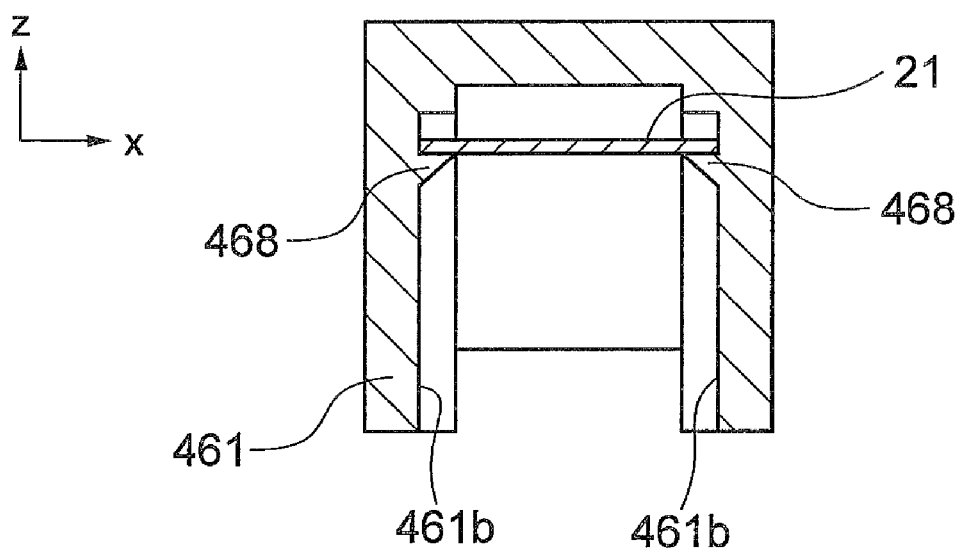
FIG. 17 is a vertical cross-sectional view showing an arrangement for latching a case member of an ultrasonic motor according to a modified embodiment of the seventh embodiment.

Next, an ultrasonic motor according to a seventh embodiment and modified embodiments thereof will be described by referring to FIG. 16A, FIG. 16B, and FIG. 17. FIG. 16A is a vertical cross-sectional view showing an arrangement for engaging a case member of the ultrasonic motor according to the seventh embodiment, and is a diagram corresponding to FIG. 1A. In FIG. 16A, members excluding a case member 461 are indicated by dotted lines or omitted. FIG. 16B is a cross-sectional view taken along a line XVIB-XVIB in FIG. 16A. FIG. 17 is a vertical cross-sectional view showing an arrangement for engaging a case member of an ultrasonic motor according to a modified embodiment of the seventh embodiment, and is a diagram corresponding to FIG. 16B. Even in FIG. 17, some of the members are omitted for the sake of convenience of description.

In a case member 461 according to the seventh embodiment, as shown in FIG. 16, a groove 461b which is through in a direction of height (z-direction) from an upper surface 461s up to an opening portion 463 is formed in an inner wall of an accommodating recess 466 which accommodates the pressing portion 21, the vibrator 22, and the supporting member 23. The groove 461b, similarly as the case recess 111b in the case member 111 shown in FIG. 8 and FIG. 12, is provided such that the positions of the pressing member 21 and the supporting member 23 (vibrator 22) can be regulated. Furthermore, a latching portion 467 which is to be latched with the supporting member 23 which is introduced once at an interior of the groove 461b is provided in the groove 461b. Concretely, a protruding portion is provided on a part of the groove 461b of the pressing member 21 and the vibrator 22 such that, a width of a groove facing is narrower than a width of the vibrator supporting member 23, in a direction of width (y-direction) of the case member 461, and is let to be the latching portion 467. By providing such latching portion 467, since it is possible to prevent falling of the pressing member 21 and the vibrator 22 after the pressing member 21 and the vibrator 22 are inserted along the groove 461b, a degree of freedom of a method of assembling becomes higher.

However, it is also possible to provide a latching portion 468 to the groove 461b instead of the latching portion 467 or in addition to the latching portion 467. The latching portion 468 is a protruding portion which is provided such that a width of the groove facing becomes narrower than a width of the pressing member 21.

The rest of the structure, action, and effect are similar as in the first embodiment.

Eighth Embodiment

Figure 18A:
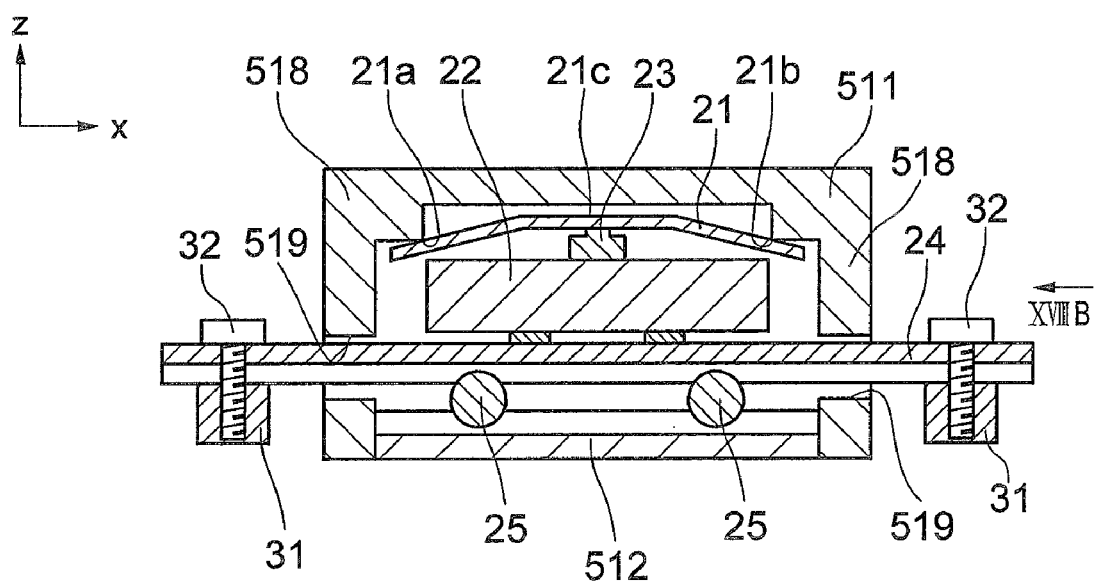
FIG. 18A is a vertical cross-sectional view showing a structure of an ultrasonic motor according to an eighth embodiment.
Figure 18B:
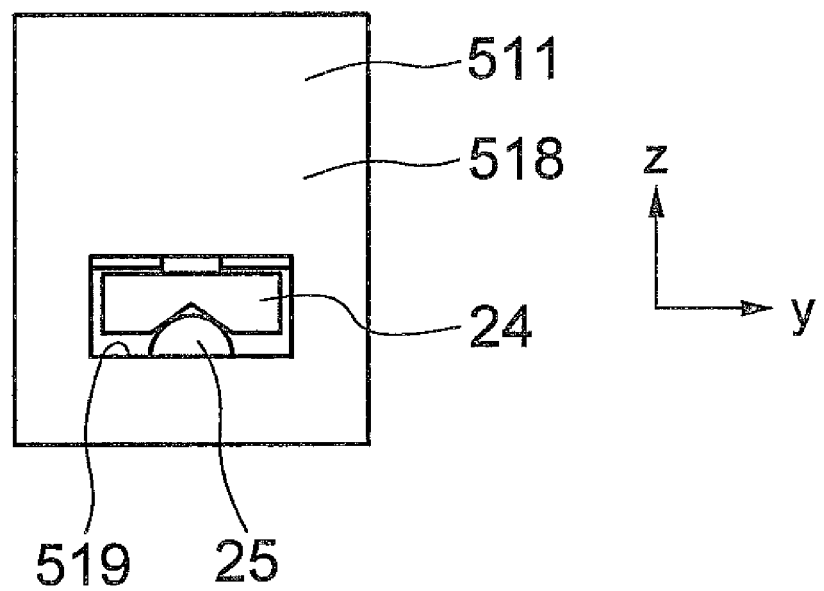
FIG. 18B is a side view as seen from XVIIIB-direction in FIG. 18A.

Next, an ultrasonic motor according to an eighth embodiment will be described by referring to FIG. 18A and FIG. 18B. FIG. 18A is a vertical cross-sectional view showing a structure of the ultrasonic motor according to the eighth embodiment, and is a diagram corresponding to FIG. 1A. FIG. 18B is a side view as seen from XVIIIB-direction in FIG. 18A.

In the ultrasonic motor according to the eighth embodiment, a hole portion 519 each is formed in two side surfaces in a longitudinal direction (x-direction) of a case member 511, and by passing the driven member 24 through two hole portions 519, it is possible to insert the case member 511 through the driven member 24. In this case member 511, a portion latching a base member 512 and the case member 511 is provided on a side surface portion on which the hole portion 519 is provided. By structuring the case member 511 in such manner, since the two side surfaces 518 of the case member 511 exist up to a portion latching with the base member 512, the case member 511 assumes a perfect box shape, and accordingly, it is possible to improve hardness of the case member 511.

The rest of the structure, action, and effect are similar as in the first embodiment.

Ninth Embodiment

Figure 19A:
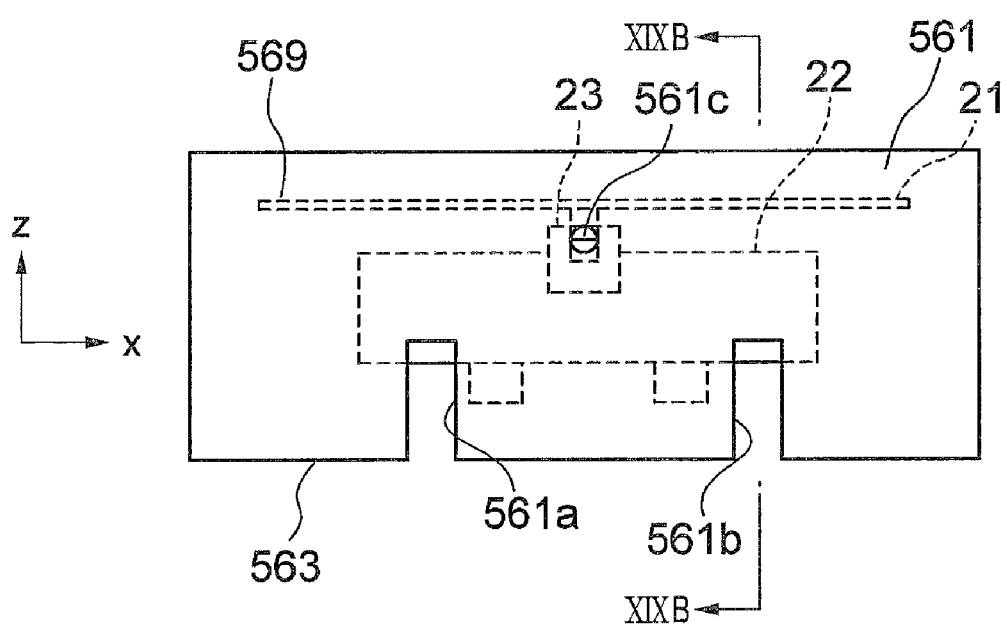
FIG. 19A is a side view showing a structure of a case member of an ultrasonic motor according to a ninth embodiment.
Figure 19B:
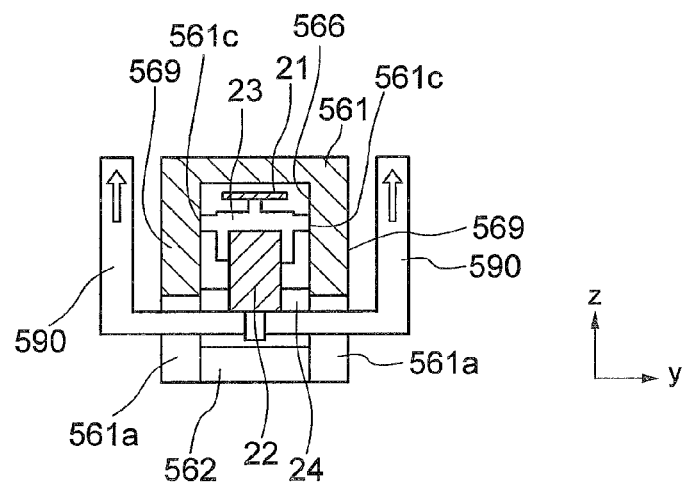
FIG. 19B is a cross-sectional view taken along a line XIX-XIX in FIG. 19A.

An ultrasonic motor according to a ninth embodiment will be described below by referring to FIG. 19A and FIG. 19B. FIG. 19A is a side view showing a structure of a case member 561 of the ultrasonic motor according to the ninth embodiment. FIG. 19B is a cross-sectional view taken along a line XIX-XIX in FIG. 19A.

When the structure of the case member is let to be as shown in the embodiments described above, for assembling the driven member 24, it is to be inserted from an opening provided at a lower portion of the case member. From a point of view of replacing the driven member and from other point of view, it is desirable to insert the vibrator while holding by using a jig etc. such that, the vibrator does not interfere with the driven member. Therefore, in the ultrasonic motor according to the ninth embodiment, a notch 561a is provided in a side surface 569 of the case member 561. This notch 561a is opened up to a position where, one surface of the vibrator 22 is visible from outside. In such structure, by inserting a front end of a vibrator holding jig 590 as shown in FIG. 19B into the notch 561a for instance, it is possible to support such that the vibrator 22 does not fall from a side of a lower surface 563, and accordingly, it is possible to hold the vibrator 22, the supporting member 23, and the pressing member 21 in a posture as shown in FIG. 19B showing the case member 561. Furthermore, by the vibrator holding jig 590, since it is possible to assemble the driven member 24 after vibrator 22 is lifted up to a position where the driven member 24 can be inserted, replacing of the driven member 24 becomes easy.

Moreover, in the ultrasonic motor according to the ninth embodiment, a through hole 561c is provided at a substantially central portion of the side surface 569 of the case member 561 such that the supporting member 23 of the vibrator 22 is visible. In other words, the through hole 561c reaches up to an accommodating recess 566 which accommodates the vibrator 22, the supporting member 23, and the driven member 24. After assembling a base member 562 with the case member 561, and exerting a desired thrust to the driven member 24 by the pressing member 21, when an adhesive is applied from the through hole 561c, it is possible to fix the vibrator 22 and the case member 561 by adhesive. Accordingly, a gap between the case member 561 and the vibrator 22 is filled, and since it is possible to suppress a movement of the vibrator 22 in a horizontal direction (x-direction) at the time of actual driving, it is possible to transmit the driving force to the driven member 24 efficiently.

A shape of the notch and a shape the through hole are not restricted to the shape in the diagram, and it may be a round hole or an angular hole.

The rest of the structure, action, and effect are similar as in the first embodiment.

Tenth Embodiment

Figure 20A:
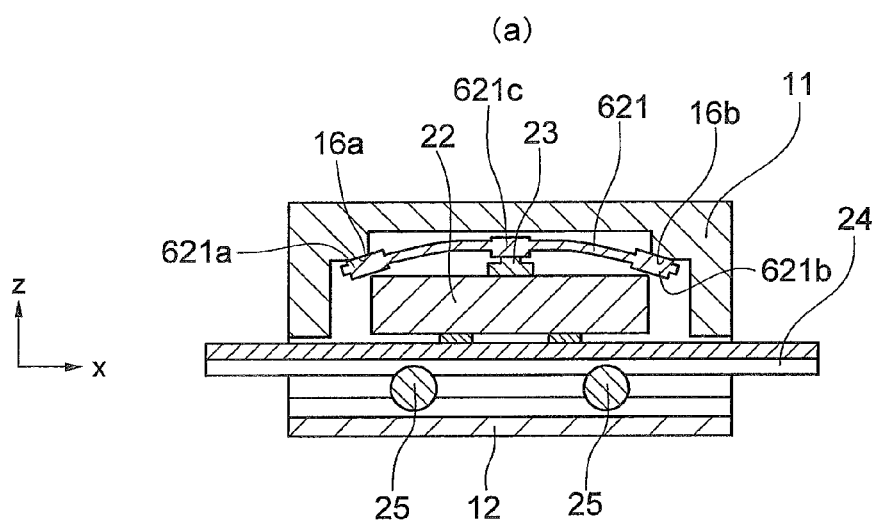
FIG. 20A is a vertical cross-sectional view showing a structure of an ultrasonic motor according to a tenth embodiment.
Figure 20B:
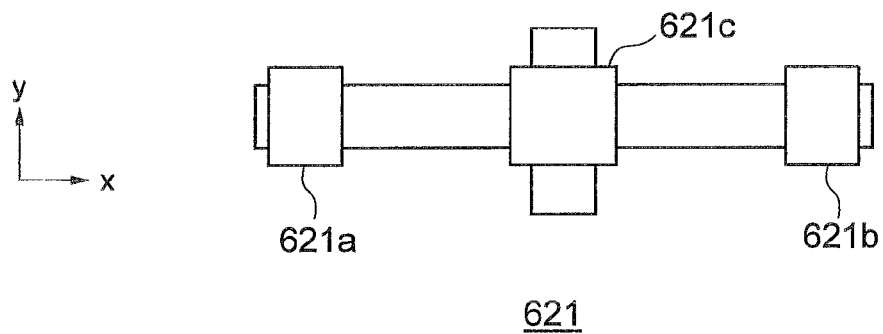
FIG. 20B is a plan view showing a structure of a pressing member according to the tenth embodiment.

Next, an ultrasonic motor according to a tenth embodiment will be described by referring to FIG. 20A and FIG. 20B. FIG. 20A is a vertical cross-sectional view showing a structure of the ultrasonic motor according to the tenth embodiment, and is a diagram corresponding to FIG. 1A. FIG. 20B is a plan view showing a structure of a pressing member 621 according to the tenth embodiment.

As shown in FIG. 19A and FIG. 19B, in a pressing member 621, a resin member is outsert-molded on a contact portion 621c which is in contact with the supporting member 23, and on contact portions 621a and 621b which are in contact with the contact projecting portions 16a and 16b of the case member 11. When the resin members are outsert-molded on the pressing member 621, it is possible to attenuate the vibrations of the vibrator 22 by a damping effect of the resin members, independent of a material of the case member 11 and the supporting member 23, and consequently, it is possible to prevent propagation of vibrations to the case member 11, and to prevent decline in drive characteristics. Moreover, since the resin members are formed integrally by outsert-molding, it is possible to reduce the number of steps such as sticking the resin members.

The rest of the structure, action, and effect are similar as in the first embodiment.

Eleventh Embodiment

Figure 21A:
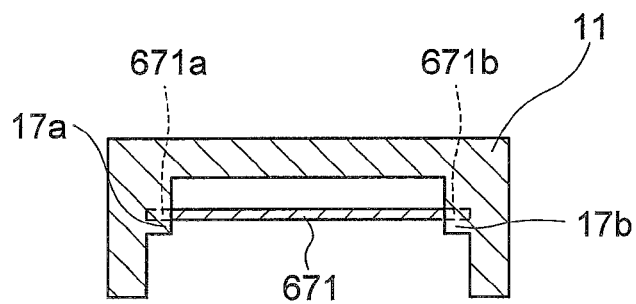
FIG. 21A is a vertical cross-sectional view showing a structure of an ultrasonic motor according to an eleventh embodiment, and is a diagram showing a state of the ultrasonic motor before assembling.
Figure 21B:
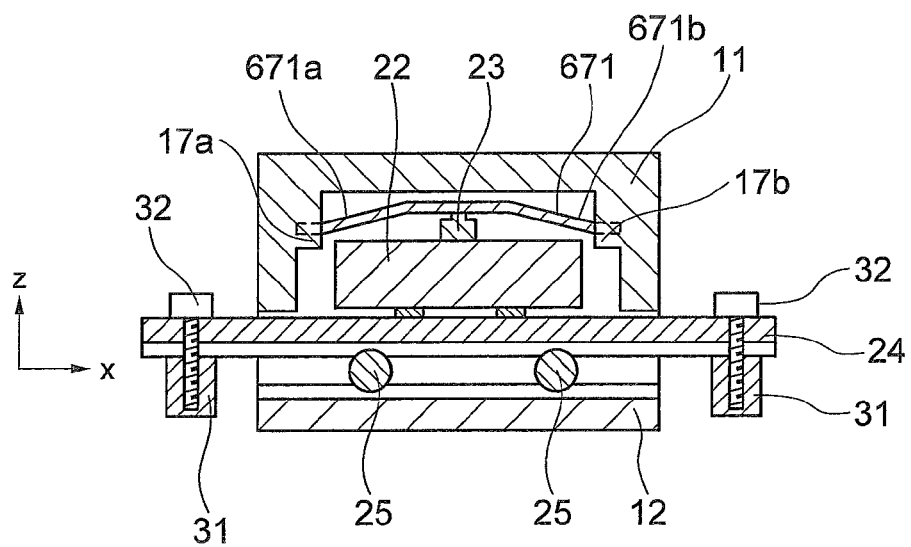
FIG. 21B is a diagram showing a state of the ultrasonic motor after assembling.
Figure 22A:
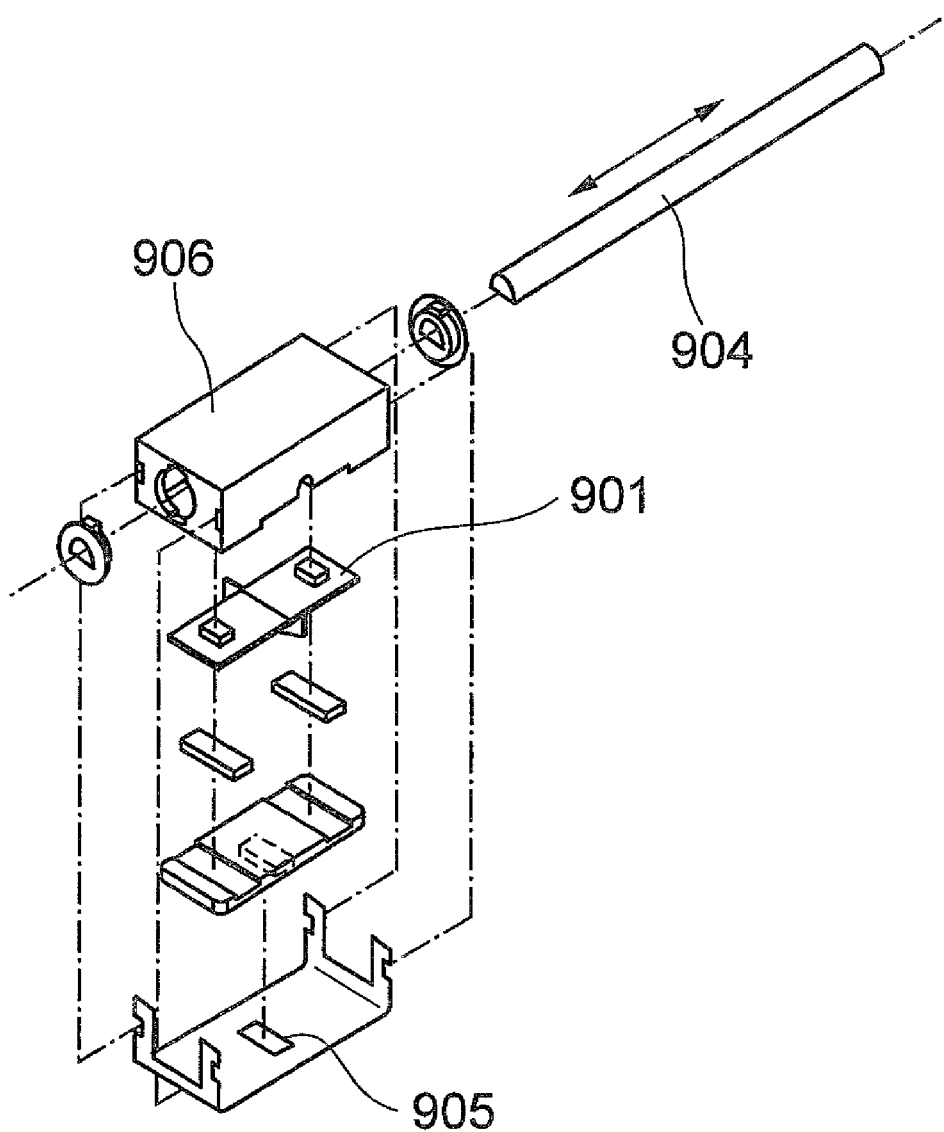
FIG. 22A is a diagram showing a structure of a conventional linear drive ultrasonic motor, and is an exploded perspective view.
Figure 22B:
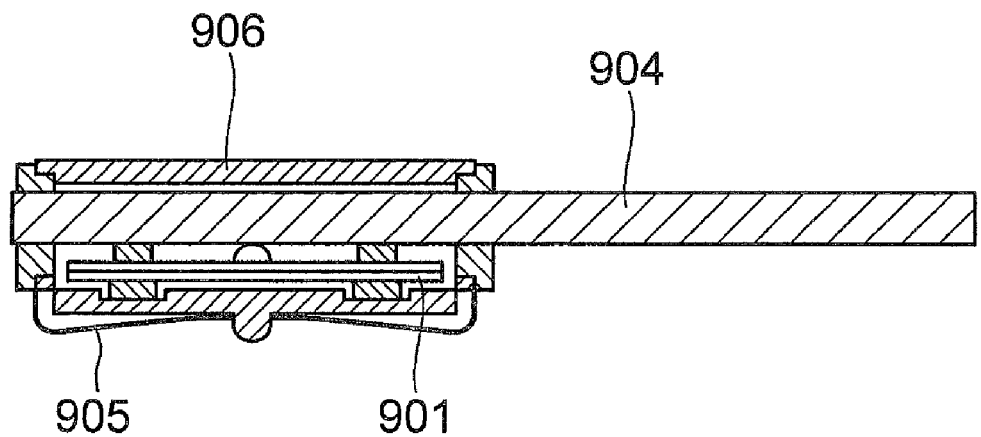
FIG. 22B is a diagram showing a structure of the conventional linear drive ultrasonic motor, and is a vertical cross-sectional view.

Next, an ultrasonic motor according to an eleventh embodiment will be described by referring to FIG. 21A and FIG. 22B. FIG. 21A and FIG. 21B are vertical cross-sectional views showing a structure of the ultrasonic motor according to the eleventh embodiment, and are diagrams corresponding to FIG. 1. FIG. 21A is a diagram showing a state of the ultrasonic motor before assembling where, the case member 11 and a pressing member 671 are outsert-molded, and FIG. 21B is a diagram showing a state of the ultrasonic motor after assembling. In the ultrasonic motor according to the eleventh embodiment, two end portions 671a and 671b of the pressing member 671 are formed integrally by inserting into inner walls 17a and 17b of the case member 11. As shown in FIG. 21A, before assembling the ultrasonic motor, the pressing member 671 is in a natural state and not bent. However, as shown in FIG. 21B, after assembling the ultrasonic motor, by disposing the vibrator 22, the supporting member 23, the driven member 24, and the rolling member 25 at predetermined positions, and assembling together the case member 11 and the base member 12, the pressing member 671 is bent. Accordingly, the pressing member 671 presses the vibrator 22 such that a predetermined frictional force is generated between the vibrator 22 and the driven member 24. By making such an arrangement, assembling of the pressing member on the case member is unnecessary, thereby improving assemblability as well as reducing a variation in assembling position of the pressing member.

The rest of the structure, action, and effect are similar as in the first embodiment.

Generally, in an ultrasonic motor apparatus, making a unit structure in which, main structural components are packaged, is effective from a point of generality and stabilizing of characteristics, and small-sizing has been sought. However, in a conventional ultrasonic motor, in small-sizing with a pressing member (bias applying member) capsuled in the case member, a variation in thrust is susceptible to be substantial, thereby making it difficult. However, in a state of the pressing member installed in the case and exposed, a function of protecting contents as a case is insufficient.

However, according to the ultrasonic motor according to each of the abovementioned embodiments, it is possible to carry out positioning of the pressing member easily, and to realize a unit structure of which assembling and maintenance are easy. In other words, the vibrator is accommodated on the side of the opening portion of the case member in the form of a box and the pressing member is guided and accommodated on an opposite side of the opening portion. At this time, both end portions of the pressing member are disposed to make contact with protruding portions at two locations provided on the upper surface of the accommodating recess which accommodates the vibrator of the case member, and the substantially central portion of the pressing member is disposed to make a contact with the supporting member for positioning the vibrator. Accordingly, small-sizing becomes possible, and since the case member, which is a hard body, protects by covering each member including the pressing member, it is possible to fix the case member on an external apparatus, and to bring the case member in contact with the external apparatus. Furthermore, inside the case member, which is closed by the base member, since the vibrator makes a contact with the driven member by the thrust of the pressing member, it is possible to prevent generation of abnormal noise. Moreover, by regulating the position of the pressing member and/or the vibrator, it is possible to suppress generation of resonance which is unnecessary for precision driving of the driven member. Furthermore, by an arrangement of disposing the vibrator between the pressing member and a moving member, movement of the member to be moved becomes smooth.

INDUSTRIAL APPLICABILITY

As it has been described above, the linear drive ultrasonic motor according to the present invention is suitable for highly accurate drive of a small-size equipment.

The invention claimed is:
1. A linear drive ultrasonic motor comprising at least:
an ultrasonic vibrator having a piezoelectric element;
a driven member which is driven by a frictional force between the driven member and the ultrasonic vibrator;
a pressing member which presses the ultrasonic vibrator such that a frictional force is generated between the ultrasonic vibrator and the driven member;
a case member which accommodates the ultrasonic vibrator and the pressing member; and
a base member which movably supports the driven member; wherein
the case member is assembled with the base member, in a state of a central portion of the pressing member making a contact with the ultrasonic vibrator, and two end portions sandwiching at least the central portion, from among the end portions of the pressing member making a contact with the case member;
a distance (A) in a direction of height from a surface of the case member in contact with the pressing member, up to a fixing or a latching surface with the base member, a distance (B) in a direction of height from a surface of the pressing member in a natural state without being bent, in contact with the case member, up to a surface of contact with the ultrasonic vibrator, a distance (C) in a direction of height from a surface of the ultrasonic vibrator in contact with the pressing member, up to a surface of contact with the driven member, a distance (D) in a direction of height from a surface of the driven member in contact with the ultrasonic vibrator, up to a surface of the base member fixing or latching with the case member, and an amount of deformation by bending (X) in a direction of height which generates a desired thrust of the pressing member satisfy a relationship (A)=(B)+(C)+(D)−(X).

2. A linear drive ultrasonic motor comprising at least:

an ultrasonic vibrator having a piezoelectric element;

a driven member which is driven by a frictional force between the driven member and the ultrasonic vibrator;

a pressing member which presses the ultrasonic vibrator such that a frictional force is generated between the ultrasonic vibrator and the driven member;

a case member which accommodates the ultrasonic vibrator and the pressing member; and a base member which movably supports the driven member; wherein the case member is assembled with the base member, in a state of a central portion of the pressing member making a contact with the ultrasonic vibrator, and two end portions sandwiching at least the central portion, from among the end portions of the pressing member making a contact with the case member; and the case member, on a side surface of an accommodating recess which accommodates the ultrasonic vibrator and the pressing member, has a projecting portion which comes close to at least a part of an end surface in a direction of width of the pressing member.

3. A linear drive ultrasonic motor comprising at least:

an ultrasonic vibrator having a piezoelectric element;

a driven member which is driven by a frictional force between the driven member and the ultrasonic vibrator;

a pressing member which presses the ultrasonic vibrator such that a frictional force is generated between the ultrasonic vibrator and the driven member;

a case member which accommodates the ultrasonic vibrator and the pressing member; and a base member which movably supports the driven member; wherein the case member is assembled with the base member, in a state of a central portion of the pressing member making a contact with the ultrasonic vibrator, and two end portions sandwiching at least the central portion, from among the end portions of the pressing member making a contact with the case member; and the case member, on an upper surface of an accommodating recess which accommodates the ultrasonic vibrator and the pressing member, has two third-protruding portions making a contact with the pressing member and the two end portions, respectively.

4. A linear drive ultrasonic motor comprising at least:

an ultrasonic vibrator having a piezoelectric element;

a driven member which is driven by a frictional force between the driven member and the ultrasonic vibrator;

a pressing member which presses the ultrasonic vibrator such that a frictional force is generated between the ultrasonic vibrator and the driven member;

a case member which accommodates the ultrasonic vibrator and the pressing member; and a base member which movably supports the driven member; wherein the case member is assembled with the base member, in a state of a central portion of the pressing member making a contact with the ultrasonic vibrator, and two end portions sandwiching at least the central portion, from among the end portions of the pressing member making a contact with the case member; and a resin member is outsert-molded on a portion of the pressing member in contact with the case member, or on a portion of the pressing member in contact with the ultrasonic vibrator, or on both portions of the pressing member in contact with the case member and the ultrasonic vibrator.

* * * * *